US012421898B2

(12) United States Patent
Ertas et al.

(10) Patent No.: US 12,421,898 B2
(45) Date of Patent: Sep. 23, 2025

(54) GEARBOX ASSEMBLY WITH LUBRICANT EXTRACTION VOLUME RATIO

(71) Applicants: General Electric Company, Evendale, OH (US); GE Avio S.r.l., Rivalta di Torino (IT)

(72) Inventors: Bugra H. Ertas, Niskayuna, NY (US); Xiaohua Zhang, Glenville, NY (US); Miriam Manzoni, Rivalta di Torino (IT); Flavia Turi, Bari (IT); Andrea Piazza, Turin (IT); Arthur W. Sibbach, Boxford, MA (US)

(73) Assignees: GENERAL ELECTRIC COMPANY, Evendale, OH (US); GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 18/990,685

(22) Filed: Dec. 20, 2024

(65) Prior Publication Data
US 2025/0122835 A1    Apr. 17, 2025

Related U.S. Application Data

(63) Continuation-in-part of application No. 18/068,017, filed on Dec. 19, 2022.

(30) Foreign Application Priority Data

Jun. 22, 2022    (IT) .................. 102022000013213

(51) Int. Cl.
F02C 7/06        (2006.01)
F01D 25/20    (2006.01)
(Continued)

(52) U.S. Cl.
CPC ............... F02C 7/06 (2013.01); F01D 25/20 (2013.01); F02C 7/14 (2013.01); F02C 7/36 (2013.01);
(Continued)

(58) Field of Classification Search
CPC ...... F02C 7/06; F02C 7/14; F02C 7/36; F01D 25/20; F16H 57/02; F16H 57/0413;
(Continued)

(56) References Cited

U.S. PATENT DOCUMENTS 1,329,720 A    2/1920    Erling
1,436,734 A    11/1922    Stoffer
(Continued)

FOREIGN PATENT DOCUMENTS

BR    102016011135 A2    11/2016
BR    102016020095 A2    4/2017
(Continued)

*Primary Examiner* — Craig Kim
(74) *Attorney, Agent, or Firm* — Venable LLP; Peter T. Hrubiec; Michele V. Frank

(57) ABSTRACT

A gearbox assembly includes a gearbox and a gutter for collecting a gearbox lubricant scavenge flow from the gearbox. The gutter is characterized by a lubricant extraction volume ratio between 0.01 and 0.3, inclusive of the endpoints. The lubricant extraction volume ratio is defined by $$\frac{V_G}{V_{GB}}.$$

$V_G$ is a gutter volume of the gutter and $V_{GB}$ is a gearbox volume of the gearbox. A gas turbine engine includes the gearbox assembly and a lubrication system. The lubrication system includes a tank that stores a lubricant therein, one or more lubricant pumps for generating a flow of lubricant from the tank to the gearbox assembly, and a flow rate control valve. The flow rate control valve has a flow inlet and a flow outlet and defines a variable throughput from the flow inlet to the flow outlet for controlling a flowrate of the lubricant to the gearbox assembly.

20 Claims, 9 Drawing Sheets

(51) Int. Cl.
| | | |
|---|---|---|
| F02C 7/14 | (2006.01) | |
| F02C 7/36 | (2006.01) | |
| F16H 57/02 | (2012.01) | |
| F16H 57/04 | (2010.01) | |

(52) U.S. Cl.
CPC ......... *F16H 57/02* (2013.01); *F16H 57/0413* (2013.01); *F16H 57/0415* (2013.01); *F16H 57/0423* (2013.01); *F16H 57/0435* (2013.01); *F16H 57/0436* (2013.01); *F16H 57/045* (2013.01); *F05D 2260/213* (2013.01); *F05D 2260/4031* (2013.01); *F05D 2260/98* (2013.01); *F16H 2057/02039* (2013.01)

(58) Field of Classification Search
CPC ............. F16H 57/0415; F16H 57/0423; F16H 57/0435; F16H 57/0436; F16H 57/045; F16H 2057/02039; F05D 2260/213; F05D 2260/4031; F05D 2260/98
See application file for complete search history.

(56) References Cited

U.S. PATENT DOCUMENTS

| | | | |
|---|---|---|---|
| 2,652,296 | A | 9/1953 | Gunnar |
| 2,853,948 | A | 9/1958 | Aspelin |
| 3,325,232 | A | 6/1967 | Pabst |
| 3,692,372 | A | 9/1972 | Pineo |
| 3,955,365 | A | 5/1976 | Arao |
| 4,177,693 | A | 12/1979 | Ivanko |
| 4,235,485 | A | 11/1980 | Reiter |
| 4,319,608 | A | 3/1982 | Raikov |
| 4,428,628 | A | 1/1984 | Brown |
| 4,479,682 | A | 10/1984 | Olivier |
| 4,891,934 | A | 1/1990 | Huelster |
| 4,968,158 | A | 11/1990 | Atkinson |
| 4,971,457 | A | 11/1990 | Carlson |
| 5,119,905 | A | 6/1992 | Murray |
| 5,121,599 | A | 6/1992 | Snyder |
| 5,121,815 | A | 6/1992 | Francois |
| 5,272,868 | A | 12/1993 | Ciokajlo |
| 5,441,351 | A | 8/1995 | Grunze |
| 6,058,694 | A | 5/2000 | Ackerman |
| 6,979,131 | B1 | 12/2005 | Lippert |
| 7,293,920 | B2 | 11/2007 | Arena |
| 7,490,460 | B2 | 2/2009 | Moniz |
| 7,883,438 | B2 | 2/2011 | McCune |
| 7,918,649 | B2 | 4/2011 | Nakagawa |
| 8,075,438 | B2 | 12/2011 | Vetters |
| 8,083,030 | B2 | 12/2011 | Portlock |
| 8,256,576 | B2 | 9/2012 | Glahn |
| 8,261,527 | B1 | 9/2012 | Stearns |
| 8,348,803 | B2 | 1/2013 | Matsuoka |
| 8,393,799 | B2 | 3/2013 | Dahl |
| 8,398,525 | B2 | 3/2013 | Matsuoka |
| 8,517,672 | B2 | 8/2013 | McCooey |
| 8,535,009 | B2 | 9/2013 | Hofmann |
| 8,740,464 | B2 | 6/2014 | Berns |
| 8,747,272 | B2 | 6/2014 | Imai |
| 8,777,792 | B2 | 7/2014 | Imai |
| 8,869,940 | B2 | 10/2014 | Johnson |
| 8,968,148 | B2 | 3/2015 | Matsuoka |
| 8,969,148 | B2 | 3/2015 | Vinet |
| 8,985,277 | B2 | 3/2015 | Hetherington |
| 9,038,779 | B2 | 5/2015 | McCune |
| 9,404,420 | B2 | 8/2016 | Gallet |
| 9,410,448 | B2 | 8/2016 | Sheridan |
| 9,790,804 | B2 | 10/2017 | Lepretre |
| 10,082,105 | B2 | 9/2018 | McCune |
| 10,247,020 | B2 | 4/2019 | McCune |
| 10,287,915 | B2 | 5/2019 | McCune |
| 10,364,881 | B2 | 7/2019 | Pikovsky |
| 10,605,351 | B2 | 3/2020 | Sheridan |
| 11,060,417 | B2 | 7/2021 | McCune |
| 11,066,945 | B2 | 7/2021 | McCune |
| 11,203,974 | B2 | 12/2021 | Sheridan |
| 11,236,637 | B2 | 2/2022 | Parnin |
| 11,268,453 | B1 | 3/2022 | Desjardins |
| 11,339,725 | B2 | 5/2022 | Simon |
| 11,719,127 | B2 | 8/2023 | Davis |
| 11,725,589 | B2 * | 8/2023 | Sheridan ................. F02C 7/06 416/174 |
| 12,044,305 | B2 * | 7/2024 | Jacquemard ........... F01D 25/18 |
| 12,214,369 | B2 * | 2/2025 | Robert .................... B05B 14/48 |
| 2001/0047647 | A1 | 12/2001 | Cornet |
| 2005/0041901 | A1 | 2/2005 | Yakura |
| 2005/0148425 | A1 | 7/2005 | Nakagawa |
| 2008/0116010 | A1 * | 5/2008 | Portlock ................ F01D 25/18 184/6.12 |
| 2008/0121376 | A1 | 5/2008 | Schwarz |
| 2010/0027932 | A1 | 2/2010 | Fujiwara |
| 2010/0107648 | A1 | 5/2010 | Bulin |
| 2011/0030385 | A1 | 2/2011 | Ellans |
| 2013/0017089 | A1 | 1/2013 | Stiesdal |
| 2013/0047624 | A1 | 2/2013 | Suciu |
| 2013/0129269 | A1 | 5/2013 | Grehn |
| 2013/0192258 | A1 | 8/2013 | Kupratis |
| 2013/0269479 | A1 | 10/2013 | van der Merwe |
| 2013/0318939 | A1 | 12/2013 | Parnin |
| 2013/0319006 | A1 | 12/2013 | Parnin |
| 2014/0075916 | A1 | 3/2014 | Augros |
| 2014/0109589 | A1 | 4/2014 | Pritchard, Jr. |
| 2014/0161591 | A1 | 6/2014 | Venter |
| 2014/0241851 | A1 | 8/2014 | Demitraszek |
| 2014/0256494 | A1 | 9/2014 | Lewis |
| 2015/0030273 | A1 | 1/2015 | Sebald |
| 2015/0089918 | A1 | 4/2015 | Valva |
| 2015/0267618 | A1 | 9/2015 | Schwarz |
| 2015/0361810 | A1 * | 12/2015 | McCune ................ F01D 9/065 60/39.08 |
| 2015/0361811 | A1 | 12/2015 | Schwarz |
| 2015/0377343 | A1 | 12/2015 | Fugel |
| 2016/0032773 | A1 | 2/2016 | James |
| 2016/0341074 | A1 | 11/2016 | Fang |
| 2017/0051823 | A1 | 2/2017 | Pikovsky |
| 2017/0089218 | A1 | 3/2017 | Hasting |
| 2017/0089219 | A1 | 3/2017 | Hasting |
| 2017/0108110 | A1 | 4/2017 | Sheridan |
| 2017/0108113 | A1 | 4/2017 | Hasting |
| 2017/0152760 | A1 | 6/2017 | Tompkins |
| 2019/0113127 | A1 | 4/2019 | Gravina |
| 2019/0170004 | A1 * | 6/2019 | McCune ................ F01D 25/18 |
| 2019/0271236 | A1 | 9/2019 | McCune |
| 2019/0323597 | A1 * | 10/2019 | Sheridan ................ F01D 19/00 |
| 2019/0360578 | A1 * | 11/2019 | Chevillot ........... F16H 57/0456 |
| 2020/0165980 | A1 | 5/2020 | Di Giovanni |
| 2020/0200042 | A1 | 6/2020 | Charrier |
| 2021/0017910 | A1 | 1/2021 | Spruce |
| 2021/0148453 | A1 | 5/2021 | Pennacino |
| 2021/0222767 | A1 | 7/2021 | Jabido |
| 2021/0324762 | A1 | 10/2021 | Anglin |
| 2022/0316584 | A1 * | 10/2022 | Jacquemard .......... F16N 39/002 |
| 2022/0397040 | A1 | 12/2022 | Molesini |
| 2023/0021913 | A1 | 1/2023 | Levisse |
| 2023/0417185 | A1 * | 12/2023 | Ertas ................... F16H 57/0486 |
| 2025/0043720 | A1 * | 2/2025 | Schimmels ............... F02K 3/04 |

FOREIGN PATENT DOCUMENTS

| | | | |
|---|---|---|---|
| BR | 102016020126 | A2 | 4/2017 |
| CA | 2928973 | A1 | 11/2016 |
| CA | 2941839 | A1 | 3/2017 |
| CA | 2942693 | A1 | 3/2017 |
| CA | 2944473 | A1 | 4/2017 |
| CN | 103261592 | A | 8/2013 |
| CN | 106168166 | A | 11/2016 |
| CN | 106870028 | A | 6/2017 |
| DE | 102005029075 | A1 | 12/2006 |
| DE | 102013207780 | A1 | 8/2014 |
| DE | 102018101723 | A1 * | 7/2019 ............. B60K 6/365 |
| DE | 102019116974 | A1 * | 12/2020 ............... F02C 7/36 |
| EP | 1389671 | A2 | 2/2004 |
| EP | 1574731 | A2 | 9/2005 |
| EP | 2148114 | A1 | 1/2010 |

(56) References Cited

FOREIGN PATENT DOCUMENTS

| | | |
|---|---|---|
| EP | 2538055 A2 | 12/2012 |
| EP | 2559913 A1 | 2/2013 |
| EP | 2980368 A1 | 2/2016 |
| EP | 3095974 A1 | 11/2016 |
| EP | 3147482 A1 | 3/2017 |
| EP | 3159576 A1 | 4/2017 |
| EP | 3159578 A1 | 4/2017 |
| EP | 2855859 B1 | 1/2019 |
| FR | 2970504 A1 | 7/2012 |
| FR | 3127024 A1 | 3/2023 |
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130874 A1 | 6/2023 |
| FR | 3130875 A1 | 6/2023 |
| FR | 3130877 A1 | 6/2023 |
| FR | 3130895 A1 | 6/2023 |
| GB | 1550789 A | 8/1979 | |
| JP | H01-110825 A | 4/1989 | |
| JP | H04-318230 A | 11/1992 | |
| JP | 2007263357 A | 10/2007 | |
| JP | 2010525234 A | 7/2010 | |
| JP | 2016217352 A | 12/2016 | |
| JP | 2017062035 A | 3/2017 | |
| JP | 2017078510 A | 4/2017 | |
| WO | 2012/049322 A1 | 4/2012 | |
| WO | 2012/069274 A1 | 5/2012 | |
| WO | 2012/098324 A1 | 7/2012 | |
| WO | 2014/123857 A1 | 8/2014 | |
| WO | 2014/123863 A2 | 8/2014 | |
| WO | 2014/152347 A2 | 9/2014 | |
| WO | 2015/026899 A1 | 2/2015 | |
| WO | 2015/055291 A1 | 4/2015 | |
| WO | WO-2015147948 A2 * | 10/2015 | .............. F01D 25/20 |
| WO | WO-2015147949 A2 * | 10/2015 | .............. F01D 25/20 |
| WO | WO-2020245529 A1 * | 12/2020 | .............. F01D 15/12 |
| WO | WO-2021229167 A1 * | 11/2021 | .............. F01D 1/24 |

* cited by examiner

GEARBOX ASSEMBLY WITH LUBRICANT EXTRACTION VOLUME RATIO

CROSS REFERENCE TO RELATED APPLICATIONS

The present application is a continuation-in-part application of U.S. patent application Ser. No. 18/068,017, filed Dec. 19, 2022, which claims the benefit of Italian Patent Application No. 102022000013213, filed on Jun. 22, 2022, the entire contents of which are incorporated by reference in their entireties.

TECHNICAL FIELD

The present disclosure relates to a gearbox assembly for an engine, for example, a gas turbine engine for an aircraft.

BACKGROUND

Lubricant is used in a power gearbox to lubricate gears and rotating parts in the gearbox. Lubricant may be supplied to lubricate the mesh between the gears. As the gears of the gearbox assembly rotate during operation, the lubricant is expelled outwardly. The lubricant is captured by a gutter.

BRIEF DESCRIPTION OF THE DRAWINGS

Features and advantages of the present disclosure will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
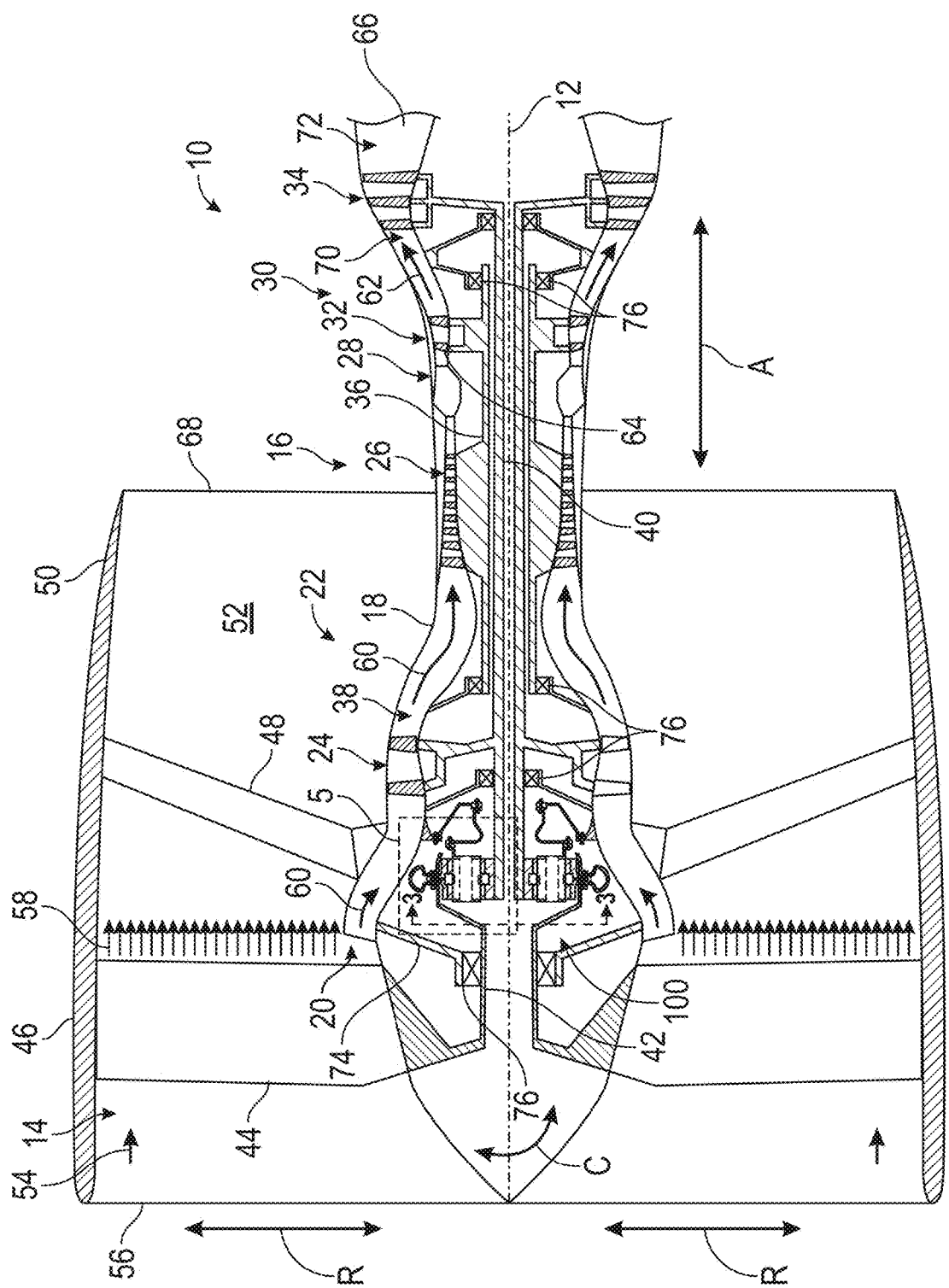
FIG. 1 illustrates a schematic, cross-sectional view of an engine, taken along a longitudinal centerline axis of the engine, according to an embodiment of the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. More particularly, forward and aft are used herein with reference to a direction of travel of the vehicle and a direction of propulsive thrust of the gas turbine engine.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, the terms "low," "mid" (or "mid-level"), and "high," or their respective comparative degrees (e.g., "lower" and "higher", where applicable), when used with compressor, combustor, turbine, shaft, fan, or gas turbine engine components, each refers to relative pressures, relative speeds, relative temperatures, or relative power outputs within an engine unless otherwise specified. For example, a "low-power" setting defines the engine or the combustor configured to operate at a power output lower than a "high-power" setting of the engine or the combustor, and a "mid-power" setting defines the engine or the combustor configured to operate at a power output higher than a "low-power" setting and lower than a "high-power" setting. The terms "low," "mid" (or "mid-level") or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine. A mission cycle for a gas turbine engine includes, for example, a low-power operation, a mid-power operation, and a high-power operation. Low-power operation includes, for example, engine start, idle, taxiing, and approach. Mid-power operation includes, for example, cruise. High-power operation includes, for example, takeoff and climb.

The various power levels of the gas turbine engine are defined as a percentage of a sea level static (SLS) maximum engine rated thrust. Low-power operation includes, for example, less than thirty percent (30%) of the SLS maximum engine rated thrust of the gas turbine engine. Mid-power operation includes, for example, thirty percent (30%) to eighty-five percent (85%) of the SLS maximum engine rated thrust of the gas turbine engine. High-power operation includes, for example, greater than eighty-five percent (85%) of the SLS maximum engine rated thrust of the gas turbine engine. The values of the thrust for each of the low-power operation, the mid-power operation, and the high-power operation of the gas turbine engine are exemplary only, and other values of the thrust can be used to define the low-power operation, the mid-power operation, and the high-power operation.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

A turbine engine can be configured as a geared engine. Geared engines include a power gearbox utilized to transfer power from a turbine shaft to a fan. Such gearboxes may include a sun gear, a plurality of planet gears, and a ring gear. The sun gear meshes with the plurality of planet gears and the plurality of planet gears mesh with the ring gear. In operation, the gearbox transfers the torque transmitted from a turbine shaft operating at a first speed to a fan shaft rotating at a second, lower speed. For a planet configuration of the gearbox, the sun gear may be coupled to the mid-shaft of a lower pressure turbine rotating at the first speed. The planet gears, intermeshed with the sun gear, then transfer this torque to the fan shaft through a planet carrier. In a star configuration, a ring gear is coupled to the fan shaft.

In either configuration, it is desired to increase efficiency. There are several effects that can negatively impact a gearbox's efficiency. For example, gearboxes experience windage across rotating components (e.g., in the bearing, in rolling surfaces, in the gears), that is, shear and drag forces are generated across the gears, pins, and bearings of the gearboxes. In another example, the rotating components of the gearbox experience friction losses due to the relative rotation between components. The windage and friction losses reduce the efficiency of the gearbox. In addition to reducing efficiency, windage and friction losses contribute to heat generation in gearboxes. The relative rotating surfaces and force transmission between the gears also generates heat in the gearboxes.

When a gearbox operates at higher efficiency a greater percentage of the input power from the LP shaft is transferred to the fan shaft. To improve gearbox efficiency, lubrication is provided to the gearboxes to provide a protective film at the rolling contact surfaces, to lubricate the components, and to remove heat from the gearbox. Lubrication supplied to the gearbox, however, needs to be removed from the gearbox. Buildup of lubrication in the gearbox may reduce efficiency and may not remove the heat from the gearbox. Furthermore, allowing the lubrication in the gearbox to enter other components of the engine may negatively impact operation of the other components. One way to remove lubrication from the gearbox is to scavenge the lubrication through a gutter. The gutter collects lubricant expelled from the gearbox during operation. Gutters are often designed to circumscribe the ring gear, without taking into account the requirements of the engine or the gearbox. This results in gutters that are too large or too small. A gutter that is larger than required for the engine takes up valuable space in the engine, adding weight to the engine and decreasing overall engine efficiency. A gutter that is smaller than required for the engine may not properly scavenge the lubricant from the gearbox, allowing leakage from the gutter and reducing the ability of the lubricant to remove heat from the gearbox. The inventors, seeking ways to improve upon existing gutters in terms of their size/capacity for particular architectures, gearbox types or mission requirements, tested different gutter configurations to ascertain what factors play into an appropriate gutter sizing.

FIG. 1 illustrates a schematic, cross-sectional view of an engine, also referred to as a gas turbine engine 10. The gas turbine engine 10 defines an axial direction A extending parallel to a longitudinal, engine centerline, also referred to as a longitudinal centerline axis 12, a radial direction R that is normal to the axial direction A, and a circumferential direction C about the longitudinal centerline axis 12 (shown in/out of the page in FIG. 1). The gas turbine engine 10 includes a fan section 14 and a core engine 16 downstream from the fan section 14.

The core engine 16 includes a core engine casing 18 that is substantially tubular and defines an annular inlet 20. The core engine casing 18 encases, in serial flow relationship, a compressor section 22 including a low-pressure (LP) compressor 24, also referred to as a booster, followed downstream by a high-pressure (HP) compressor 26, a combustion section 28, a turbine section 30 including a high-pressure (HP) turbine 32 followed downstream by a low-pressure (LP) turbine 34, and a jet exhaust nozzle section 72 downstream of the low-pressure turbine 34. A high-pressure (HP) shaft 36 drivingly connects the high-pressure turbine 32 to the high-pressure compressor 26 to rotate the high-pressure turbine 32 and the high-pressure compressor 26 in unison. The compressor section 22, the combustion section 28, and the turbine section 30 together define a core air flowpath 38 extending from the annular inlet 20 to the jet exhaust nozzle section 72.

A low-pressure (LP) shaft 40 drivingly connects the low-pressure turbine 34 to the low-pressure compressor 24 to rotate the low-pressure turbine 34 and the low-pressure compressor 24 in unison. A gearbox assembly 100 couples the low-pressure shaft 40 to a fan shaft 42 to drive the fan blades 44 of the fan section 14. The fan shaft 42 is coupled to a fan frame 74 via one or more engine bearings 76. The one or more engine bearings 76 support rotation of the fan shaft 42. The one or more engine bearings 76 also include engine bearings 76 that support rotation of the high-pressure shaft 36 and engine bearings 76 that support rotation of the low-pressure shaft 40.

The fan blades 44 extend radially outward from the longitudinal centerline axis 12 in the direction R. The fan blades 44 rotate about the longitudinal centerline axis 12 via the fan shaft 42 that is powered by the low-pressure shaft 40 across the gearbox assembly 100. The gearbox assembly 100 adjusts the rotational speed of the fan shaft 42 and, thus, the fan blades 44 relative to the low-pressure shaft 40. That is, the gearbox assembly 100 is a reduction gearbox and power gearbox that delivers a torque from the low-pressure shaft 40 running at a first speed, to the fan shaft 42 coupled to fan blades 44 running at a second, slower speed.

In FIG. 1, the fan section 14 includes an annular fan casing or a nacelle 46 that circumferentially surrounds the fan blades 44 or at least a portion of the core engine 16. The nacelle 46 is supported relative to the core engine 16 by a plurality of circumferentially spaced outlet guide vanes 48. Moreover, an aft section 50 of the nacelle 46 extends circumferentially around a portion of the outer casing (core engine casing 18) of the core engine 16 to define a bypass airflow passage 52 therebetween.

During operation of the gas turbine engine 10, a volume of air, represented by airflow 54, enters the gas turbine engine 10 through an inlet 56 of the nacelle 46 or the fan section 14. As airflow 54 passes across the fan blades 44, a first portion of the airflow 54, represented by bypass airflow 58, is directed or is routed into the bypass airflow passage 52, and a second portion of the airflow 54, represented by core airflow 60, is directed or is routed into an upstream section of the core air flowpath 38 via the annular inlet 20. The ratio between the bypass airflow 58 and the core airflow 60 defines a bypass ratio. The pressure of the core airflow 60 is increased as the core airflow 60 is routed through the high-pressure compressor 26 and into the combustion section 28, where the now highly pressurized core airflow 60 is mixed with fuel and burned to provide combustion products or combustion gases, represented by flow 62.

The combustion gases, via flow 62, are routed into the high-pressure turbine 32 and expanded through the high-pressure turbine 32 where a portion of thermal energy or of kinetic energy from the combustion gases is extracted via sequential stages of high-pressure turbine stator vanes that are coupled to the core engine casing 18 and high-pressure turbine rotor blades 64 that are coupled to the high-pressure shaft 36, thus, causing the high-pressure shaft 36 to rotate, thereby supporting operation of the high-pressure compressor 26. The combustion gases, via flow 62, are then routed into the low-pressure turbine 34 and expanded through the low-pressure turbine 34. Here, a second portion of thermal and kinetic energy is extracted from the combustion gases via sequential stages of the low-pressure turbine stator vanes that are coupled to the core engine casing 18 and low-pressure turbine rotor blades 66 that are coupled to the low-pressure shaft 40, thus, causing the low-pressure shaft 40 to rotate. This thereby supports operation of the low-pressure compressor 24 and rotation of the fan blades 44 via the gearbox assembly 100.

The combustion gases, via flow 62, are subsequently routed through the jet exhaust nozzle section 72 downstream of the low-pressure turbine 34 to provide propulsive thrust. The high-pressure turbine 32, the low-pressure turbine 34, and the jet exhaust nozzle section 72 at least partially define a hot gas path 70 for routing the combustion gases, via flow 62, through the core engine 16. Simultaneously, the pressure of the bypass airflow 58 is increased as the bypass airflow 58 is routed through the bypass airflow passage 52 before being exhausted from a fan nozzle exhaust section 68 of the gas turbine engine 10, also providing propulsive thrust.

The gas turbine engine 10 depicted in FIG. 1 is by way of example only. In other exemplary embodiments, the gas turbine engine 10 may have any other suitable configuration. For example, in other exemplary embodiments, the fan section 14 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, or turboshaft engines.

Figure 2:
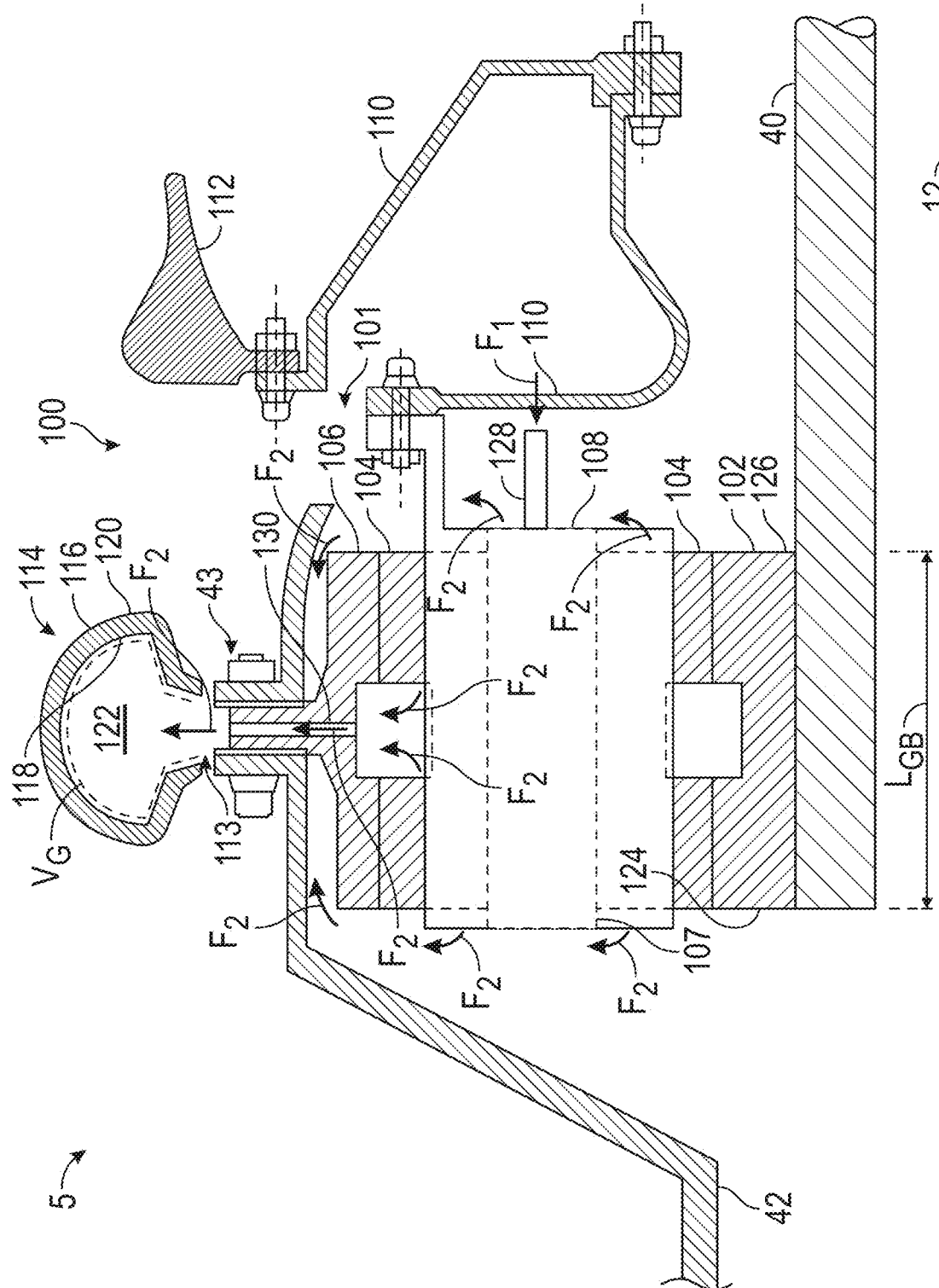
FIG. 2 illustrates a schematic, detail view of the gearbox assembly of the engine of FIG. 1, according to an embodiment of the present disclosure.
Figure 3:
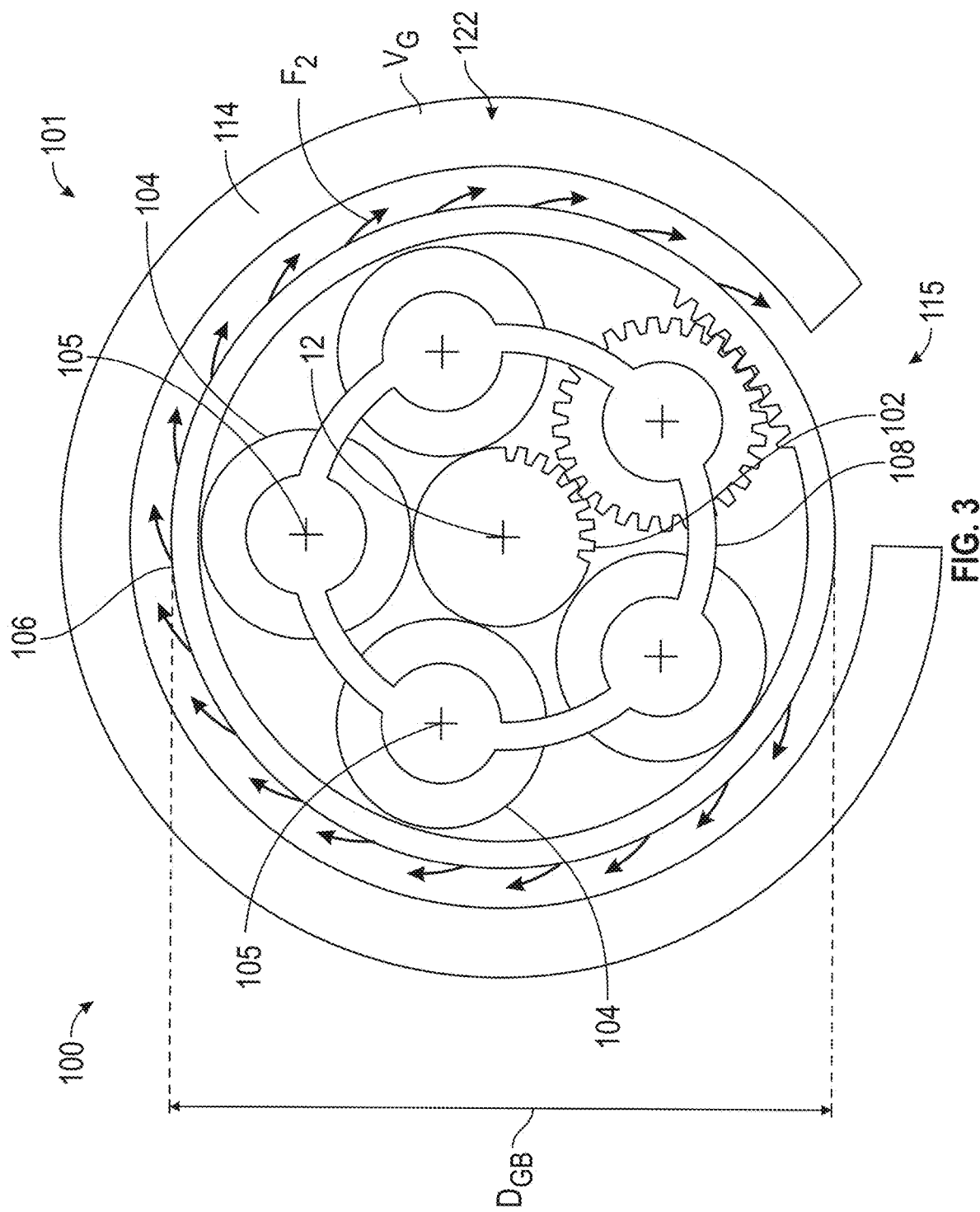
FIG. 3 illustrates a schematic, end view of the gearbox assembly of FIG. 2, taken along line 3-3 of FIG. 1, with the fan shaft omitted for clarity, according to an embodiment of the present disclosure.

FIG. 2 illustrates a detail view 5 of FIG. 1 of the gearbox assembly 100. FIG. 3 illustrates a schematic axial end view, taken along the line 3-3 of FIG. 1, of the gears of the gearbox assembly 100. The fan shaft 42 and a coupling 43 are omitted from FIG. 3 for clarity. Referring to FIGS. 2 and 3, the gearbox assembly 100 includes a gearbox 101 and a gutter 114. The gearbox 101 includes a sun gear 102, a plurality of planet gears 104, and a ring gear 106. The low-pressure turbine 34 (FIG. 1) drives the low-pressure shaft 40, which is coupled to the sun gear 102 of the gearbox assembly 100. The gearbox assembly 100 in turn drives the fan shaft 42.

Referring to FIG. 2, the low-pressure shaft 40 causes the sun gear 102 to rotate about the longitudinal centerline axis 12. Radially outwardly of the sun gear 102, and intermeshing therewith, is the plurality of planet gears 104 that are coupled together by a planet carrier 108. The planet carrier 108 is coupled, via a flex mount 110, to an engine frame 112. The planet carrier 108 constrains the plurality of planet gears 104 while allowing each planet gear of the plurality of planet gears 104 to rotate about a respective planet gear axis 105 (FIG. 3) on a pin 107. Radially outwardly of the plurality of planet gears 104, and intermeshing therewith, is the ring gear 106, which is an annular ring gear. The ring gear 106 is coupled to the fan shaft 42 at a coupling 43. The ring gear 106 is coupled via the fan shaft 42 to the fan blades 44 (FIG. 1) in order to drive rotation of the fan blades 44 about the longitudinal centerline axis 12. The gutter 114 includes a gutter wall 116 having an inner surface 118 and an outer surface 120. A gutter volume $V_G$ is defined within an interior 122 of the gutter wall 116. The gutter volume $V_G$ is illustrated by the dashed line in FIG. 2 for illustration purposes, the volume $V_G$ extends all the way to the inner surface 118 of the gutter 114. Although the gutter 114 is depicted with a relatively bell-like shape or tear-drop shape, any shape suitable to collecting lubricant is contemplated.

Although not depicted in FIG. 2, and shown only partially in FIG. 3 for clarity, each of the sun gear 102, the plurality of planet gears 104, and the ring gear 106 comprises teeth about their periphery to intermesh with teeth of the adjacent gears. The gearbox 101 has a gearbox diameter $D_{GB}$ defined by an outer diameter of the gearbox 101. The outer diameter of the gearbox 101 may be the outer diameter of the ring gear 106 such that the gearbox diameter $D_{GB}$ is defined by the outer diameter of the ring gear 106. Referring to FIG. 2, the sun gear 102, the plurality of planet gears 104, and the ring gear 106 are axially aligned such that a forwardmost end 124 of the gears is coplanar and an aftmost end 126 of the gears is coplanar. The gearbox 101 has an axial gearbox length $L_{GB}$ defined from the forwardmost end 124 of the gears to the aftmost end 126 of the gears.

Referring to FIG. 3, the gutter 114 may be circular and may wholly or partially circumscribe the gears of the gearbox assembly 100. For example, the gutter 114 may wholly or partially circumscribe the ring gear 106. Therefore, the gutter 114 is located radially outward of the sun gear 102, the plurality of planet gears 104, and the ring gear 106. The gutter 114 does not rotate with the gears of the gearbox assembly 100.

The gutter 114 includes a scavenge port 115 located at or near the bottom of the gutter 114. The scavenge port 115 allows lubricant collected by the gutter 114 to be removed from the gearbox assembly 100. Although shown as a large opening in the gutter 114, the scavenge port 115 may be any size or shape aperture or port that allows a flow of fluid from the interior 122 of the gutter 114 to a passage or reservoir (not depicted) outside of the gearbox assembly 100. By locating the scavenge port 115 at or near the bottom portion of the gutter 114, gravity may assist in causing the lubricant to flow toward the scavenge port 115 and, thus, may promote removal of the lubricant from the gearbox assembly 100. Once removed from the gutter 114, the lubricant may be recirculated through a lubricant channel 128 (FIG. 2) or collected elsewhere for disposal or removal.

The gearbox assembly 100 of FIGS. 2 and 3 is a star configuration gearbox assembly, in that the planet carrier 108 is held fixed (e.g., via the flex mount 110 to the engine frame 112) and the ring gear 106 is permitted to rotate. That is, the fan section 14 is driven by the ring gear 106. However, other suitable types of gearbox assembly 100 may be employed. In one non-limiting example, the gearbox assembly 100 may be a planetary configuration, in that the planet carrier 108 is coupled to the fan shaft 42 (FIG. 1) via an output shaft to rotate the fan shaft 42, with the ring gear 106 being held stationary or fixed. In this example, the fan section 14 (FIG. 1) is driven by the planet carrier 108. In another non-limiting example, the gearbox assembly 100 may be a differential gearbox in which the ring gear 106 and the planet carrier 108 are both allowed to rotate.

During engine operation, and referring to FIGS. 2 and 3, gears of the gearbox assembly 100 rotate as previously described. A lubricant (e.g., oil) is provided to lubricate the rotating parts of the gearbox assembly 100, including the sun gear 102, the plurality of planet gears 104, the ring gear 106, and the pins 107. A lubrication system (e.g., one of the lubrication systems shown in FIGS. 4 to 7) supplies a flow $F_1$, also referred to as a first lubricant flow $F_1$, of the lubricant through the lubricant channel 128 to supply lubricant to the gearbox assembly 100. As the gears of the gearbox assembly 100 rotate, centrifugal forces expel the lubricant radially outward, away from the longitudinal centerline axis 12, as shown by flow $F_2$, also referred to as a second lubricant flow $F_2$, or a gearbox scavenge flow $F_2$. The flow $F_2$ flows around the ring gear 106 or through a ring gear passage 130 to be collected by the gutter 114. The lubricant flows into a gutter inlet 113. In this manner, lubricant supplied through the lubricant channel 128 is collected in the gutter 114 after flowing through and around the gears and other rotating parts of the gearbox assembly 100.

Figure 4:
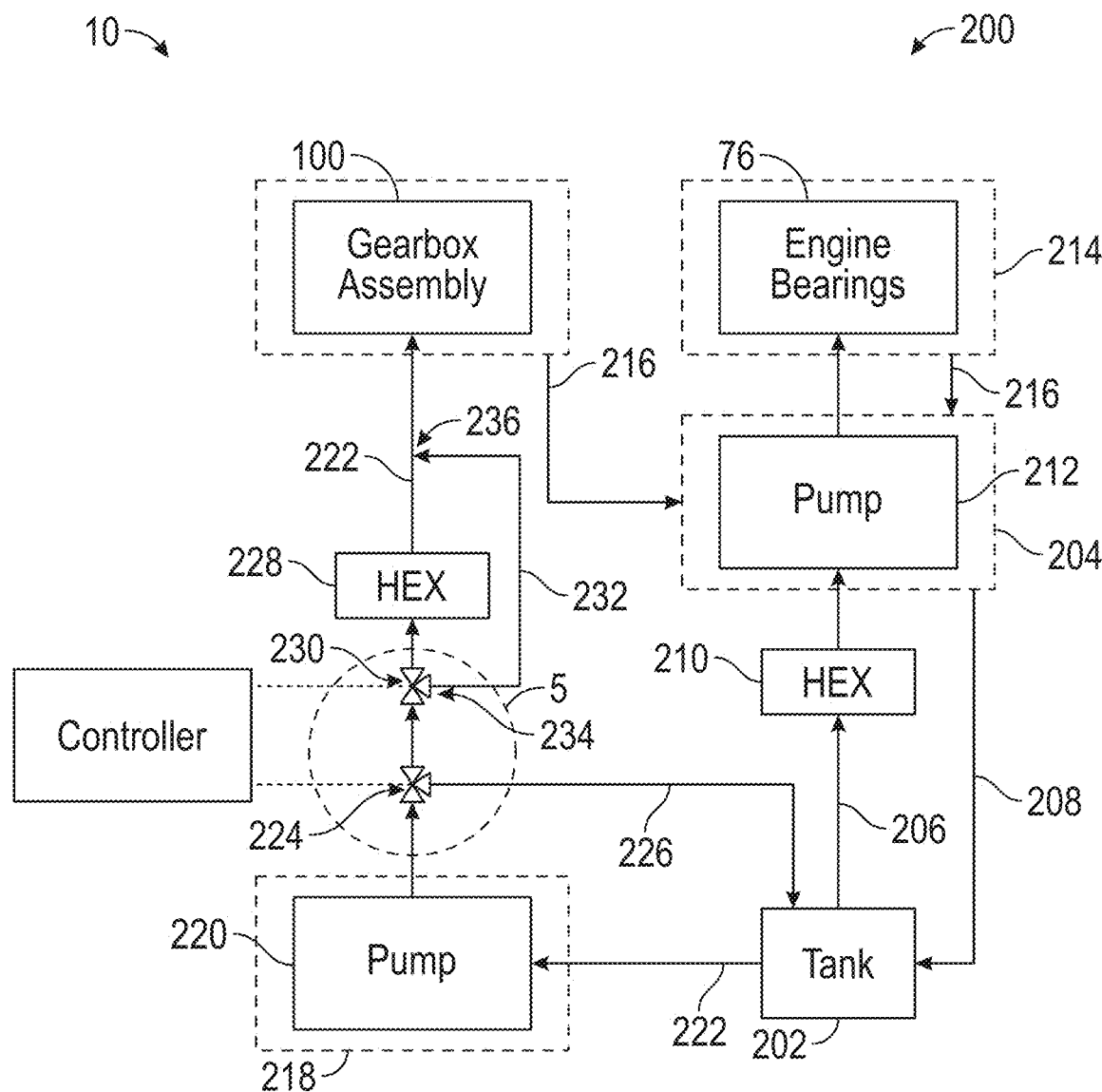
FIG. 4 is a schematic view of a lubrication system for the gas turbine engine of FIG. 1, according to an embodiment of the present disclosure.

FIG. 4 is a schematic view of a lubrication system 200 for the gas turbine engine 10, according to an embodiment of the present disclosure. The lubrication system 200 depicted is configured to provide the lubricant to one or more components of the gas turbine engine 10, including the respective bearings of such components. As used herein, the term "lubricant" refers to any substance suitable for reducing the amount of friction between surfaces in mutual contact and for carrying away generated heat. For example, in certain exemplary embodiments, lubricant may refer to oil, or the like.

The lubrication system 200 includes a tank 202 that stores a volume of a lubricant therein and an engine lubrication unit 204, or a main lubrication unit. The engine lubrication unit 204 is in fluid communication with the tank 202 through an engine lubricant supply line 206 and an engine lubricant return line 208. The engine lubricant heat exchanger 210 is disposed in, and in thermal communication with, the engine lubricant supply line 206—and any lubricant flowing therethrough. The engine lubricant heat exchanger 210 for the embodiment depicted is positioned upstream from the engine lubrication unit 204 and is configured to remove an amount of heat from the lubricant in the engine lubricant supply line 206 prior to such lubricant reaching the engine lubrication unit 204. In other exemplary embodiments, however, the engine lubricant heat exchanger 210 may alternatively be positioned in thermal communication with the engine lubricant return line 208. Such a configuration may generally be referred to as a "cold tank configuration."

The engine lubrication unit 204 includes one or more lubricant pumps including an engine lubricant pump 212, or a main pump, for generating a flow of lubricant from the tank 202 to one or more portions of the gas turbine engine 10 through the engine lubricant supply line 206. The engine lubricant pump 212 may be mechanically coupled to a shaft (e.g., the LP shaft 40 or the HP shaft 36) of the gas turbine engine 10 and driven by the shaft (e.g., the LP shaft 40 or the HP shaft 36), such that a rotational speed of the engine lubricant pump 212 corresponds to a rotational speed of the shaft. For example, in the embodiment depicted, the engine lubricant pump 212 is configured to generate the flow of lubricant at a common temperature from the tank 202 over, or through, the engine lubricant heat exchanger 210, and to at least one of the fan section 14, the LP compressor 24, the HP compressor 26, the HP turbine 32, or the LP turbine 34. More particularly, the engine lubricant pump 212 is configured to provide a pressurized flow of lubricant at a common temperature through the engine lubricant supply line 206 directly to the one or more engine bearings 76. As used herein, the term "line" refers broadly to any type of fluid line or conduit capable of carrying a flow of lubricant. Moreover, line may refer to a plurality of fluid lines or conduits capable of carrying the flow of lubricant. For example, the engine lubricant supply line 206 can include a plurality of sub-supply lines extending to the various components of the gas turbine engine 10.

The gas turbine engine 10 includes one or more engine sumps 214 for collecting lubricant provided to the engine bearings 76, as well as other components (e.g., seals, gears, etc.). Each of the engine sumps 214 are fluidly connected to the engine lubrication unit 204 through a plurality of scavenge lines 216. The engine lubrication unit 204 may include one or more suction pumps or scavenger pumps (not shown) to provide a negative pressure in the scavenge lines 216 to draw the lubricant from the respective sumps, through the engine lubrication unit 204, and back to the tank 202 through the engine lubricant return line 208.

The lubrication system 200 also includes a gearbox lubrication unit 218, or a dedicated lubrication unit. The one or more lubricant pumps include a gearbox lubricant pump 220, or a dedicated pump. The gearbox lubrication unit 218 includes the gearbox lubricant pump 220 for generating a flow of lubricant through a gearbox lubricant supply line 222 from the tank 202. More particularly, the gearbox lubricant pump 220 generates a pressure of lubricant through the gearbox lubricant supply line 222 from the tank 202. In some embodiments, the lubrication system 200 may not include the gearbox lubrication unit 218, and the gearbox lubricant pump 220 may instead be positioned in the engine lubrication unit 204.

In FIG. 4, the flow of lubricant through the gearbox lubricant supply line 222 is separate from the flow of lubricant through the engine lubricant supply line 206 and may be at a different temperature and a different pressure than the flow of lubricant through the engine lubricant supply line 206. Further, the flow of lubricant generated by the gearbox lubricant pump 220 is provided through the gearbox lubricant supply line 222 to the gearbox assembly 100. Such a configuration allows for control of certain parameters of the lubricant provided to the gearbox assembly 100 to, e.g., increase an efficiency of the gearbox assembly 100 and the gas turbine engine 10.

In some embodiments, the flow of lubricant generated by the gearbox lubricant pump 220 may additionally be provided to other components of the gas turbine engine 10. For example, the second flow of lubricant generated by the gearbox lubricant pump 220 may additionally be provided to, e.g., the one or more engine sumps 214, each of which may benefit from a flow of lubricant having a decreased flowrate or a decreased temperature.

The gearbox lubricant pump 220 may also be mechanically coupled to the shaft (e.g., the LP shaft 40 or the HP shaft 36) of the gas turbine engine 10 and driven by the shaft such that a rotational speed of the gearbox lubricant pump 220 corresponds to a rotational speed of the shaft. Therefore, without additional control mechanisms in place, an amount of lubricant provided to the gearbox assembly 100 by the gearbox lubricant pump 220 would be fixed to a rotational speed of the shaft (e.g., the LP shaft 40 or the HP shaft 36). Accordingly, the lubrication system 200 includes a flow rate control valve 224 in fluid communication with the flow of lubricant and the gearbox lubricant supply line 222 generated by the gearbox lubricant pump 220. The flow rate control valve 224 is positioned downstream from the gearbox lubricant pump 220 in the flow of lubricant generated by the gearbox lubricant pump 220. Additionally, the lubrication system 200 includes a return line 226, with the flow rate control valve 224 fluidly connected to the return line 226. The return line 226 extends from the flow rate control valve 224 directly to the tank 202 for returning a portion of the flow of lubricant to the tank 202. The return line 226 alternately may extend from the flow rate control valve 224 to an engine accessory gearbox (AGB) or to another engine sump 214 for scavenging back through the engine lubrication unit 204 and back to the tank 202.

The lubrication system 200 additionally includes a gearbox lubricant heat exchanger 228 and a bypass valve 230 positioned upstream from the gearbox lubricant heat exchanger 228. The gearbox lubricant heat exchanger 228 and the bypass valve 230 are positioned in thermal communication with the flow of lubricant in the gearbox lubricant supply line 222 for removing heat from such flow of lubricant. For the embodiment depicted, the gearbox lubricant heat exchanger 228 is positioned in thermal communication with the flow of lubricant at a location downstream of the gearbox lubricant pump 220 and the flow rate control valve 224. In some embodiments, the gearbox lubricant heat exchanger 228 may instead be positioned upstream from one or both of the gearbox lubricant pump 220 and the flow rate control valve 224.

The lubrication system 200 additionally includes a bypass line 232, with the bypass valve 230 fluidly connected to the bypass line 232 at a first end 234 of the bypass line 232. Additionally, the bypass line 232 extends from the bypass valve 230 at the first end 234 to the flow of lubricant at a location downstream from the gearbox lubricant heat exchanger 228 at a second end 236 opposite the first end 234.

Figure 5:
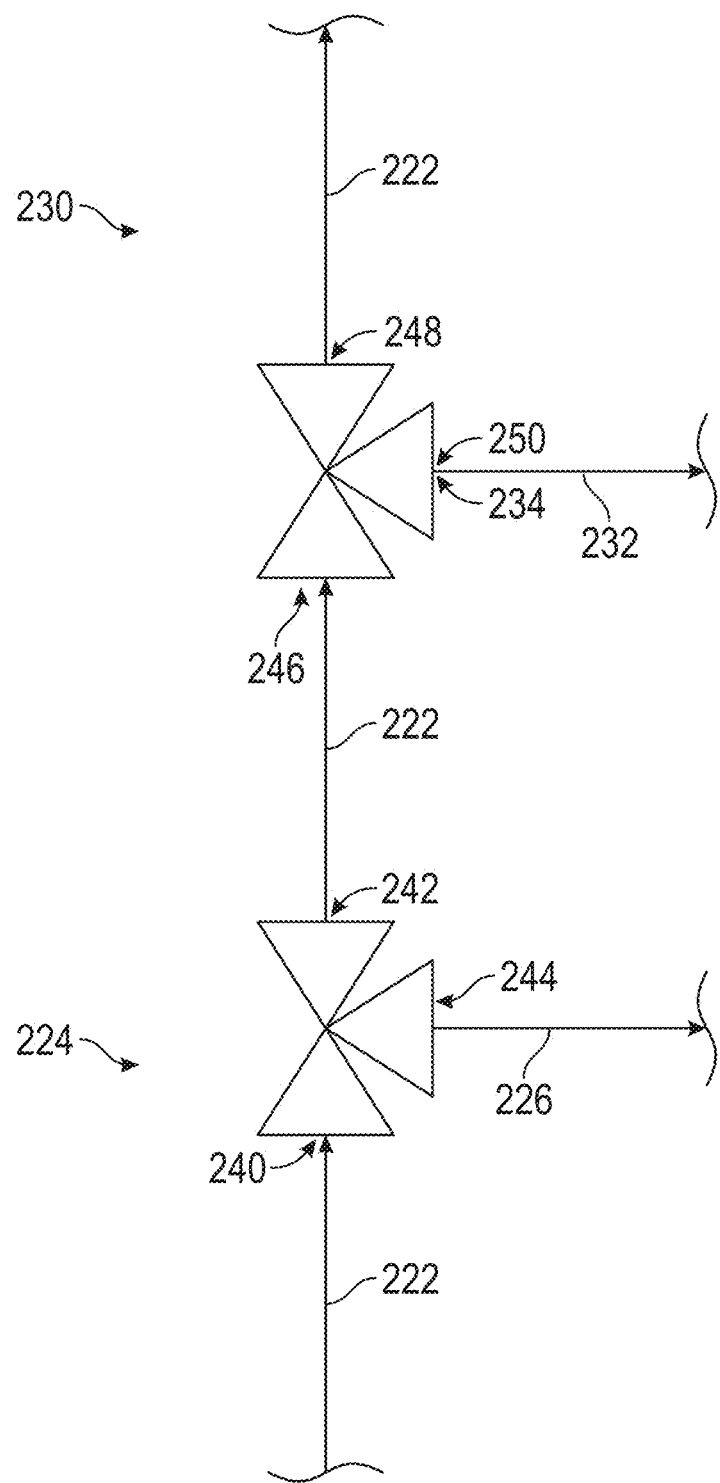
FIG. 5 is an enlarged schematic view of a portion of the lubrication system of FIG. 4, taken at detail 5 in FIG. 4, according to an embodiment of the present disclosure.

Referring now to the enlarged view of the flow rate control valve 224 provided in FIG. 5, the flow rate control valve 224 is configured as a three-way valve defining a flow inlet 240, a flow outlet 242, and a return outlet 244. The flow rate control valve 224 defines a variable throughput between the flow inlet 240 and the flow outlet 242 for controlling an amount of lubricant provided to the gearbox assembly 100 by the gearbox lubricant pump 220 (i.e., a flow rate of the lubricant provided to the gearbox assembly 100). For example, the flow rate control valve 224 may be movable between a fully open position, in which substantially all of the flow of lubricant provided to the flow inlet 240 is subsequently provided to the flow outlet 242, and a partially open position, in which at least a portion of the flow of lubricant provided to the flow inlet 240 is instead provided to the return outlet 244. In some embodiments, up to about thirty percent (30%), up to about forty percent (40%), or up to about fifty percent (50%) of the lubricant provided to the flow inlet 240 may be provided to the return outlet 244 when the flow rate control valve 224 is in the partially open position. As used herein, terms of approximation such as "about" or "approximately" refer to being within a ten percent (10%) margin of error. The return line 226 is fluidly connected to the return outlet 244 such that the flow rate control valve 224 directs the portion of the flow of lubricant to the return line 226 through the return outlet 244.

Moreover, the bypass valve 230 is a three-way valve defining a flow inlet 246, a flow outlet 248, and a bypass outlet 250. The bypass valve 230 defines a variable throughput between the flow inlet 246 and the flow outlet 248. For example, the bypass valve 230 may be movable between a fully open position, in which substantially all of the flow of lubricant provided to the flow inlet 246 is subsequently provided to the flow outlet 248, and a partially open position, in which at least a portion of the flow of lubricant provided to the flow inlet 246 is instead provided to the bypass outlet 250. In some embodiments, up to about thirty percent (30%), up to about forty percent (40%), or up to about fifty percent (50%) of the lubricant provided to the flow inlet 246 may be provided to the bypass outlet 250 when the bypass valve 230 is in the partially open position. The bypass line 232 is fluidly connected to the bypass outlet 250 (e.g., at the first end 234) such that the bypass valve 230 directs the portion of the flow of lubricant to the bypass line 232 through the bypass outlet 250.

The flow rate control valve 224 and the bypass valve 230 may each be in operable communication with a controller 80 of the gas turbine engine 10. Accordingly, the controller 80 may control the flow rate control valve 224 and the bypass valve 230 to control an amount of lubricant provided to the gearbox assembly 100 (including a pressure and flow rate of lubricant provided to the gearbox assembly 100) and a temperature of such lubricant provided to the gearbox assembly 100.

The controller 80 is in two-way communication with the gas turbine engine 10 for receiving signals from various sensors and control systems of the gas turbine engine 10 and for controlling components of the gas turbine engine 10. The controller 80, or components thereof, may be located onboard the gas turbine engine 10, onboard the aircraft, or can be located remote from each of the gas turbine engine 10 and the aircraft. The controller 80 can be a Full Authority Digital Engine Control (FADEC) that controls aspects of the gas turbine engine 10.

The controller 80 may be a standalone controller or may be part of an engine controller to operate various systems of the gas turbine engine 10. In this embodiment, the controller 80 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 80 to perform operations. The controller 80 and, more specifically, the one or more processors are programmed or configured to perform these operations, such as the operations discussed further below. In some embodiments, the instructions can be executed by the one or more processors to cause the one or more processors to complete any of the operations and functions for which the controller 80 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

In certain situations, for example, during a high-power operation, the gearbox assembly 100 may need a relatively large amount of lubricant at a relatively cool temperature. For example, when the gas turbine engine 10 is operating under conditions requiring a high amount of thrust (e.g., during takeoff conditions) in relatively hot ambient conditions, the lubrication system 200 can provide the gearbox assembly 100 with a high flow rate of lubricant at a cool temperature. In such a situation, the flow rate control valve 224 may be in the fully open position such that substantially all lubricant provided to the flow inlet 240 is subsequently provided to the flow outlet 242. Additionally, in such a situation, the bypass valve 230 may also be in the fully open position such that substantially all lubricant provided to the flow inlet 246 is subsequently provided to the flow outlet 248.

In other situations, for example, during a mid-power operation or a low-power operation, the gearbox assembly 100 may need a relatively small amount of lubricant at a relatively high temperature. For example, when the gas turbine engine 10 is operating under cruise conditions in relatively cool ambient conditions, the lubrication system 200 can provide the gearbox assembly 100 with a low flow rate of lubricant at a high temperature. Notably, providing the lubricant at a relatively high temperature may decrease a viscosity of the lubricant, thus allowing for a more efficient operation of the gearbox assembly 100. In such a situation, the flow rate control valve 224 may be in a partially open position, such that at least a portion of the lubricant provided to the flow inlet 240 is subsequently provided to the return outlet 244 and returned to the tank 202 via the return line 226. Additionally, in such a situation, the bypass valve 230 may also be in a partially open position, such that at least a portion of the lubricant provided to the flow inlet 246 is subsequently provided to the bypass outlet 250. Notably, in such a situation, a temperature of the lubricant provided to the gearbox assembly 100 may still be controlled to ensure that the temperature does not exceed a safe operating temperature of the components within the gearbox assembly 100.

The flow rate control valve 224 and the bypass valve 230 may alternatively be operated independently from one another. Accordingly, in still other situations, a relatively low amount of lubricant at a relatively low temperature may be provided to the gearbox assembly 100, or alternatively, a relatively high amount of lubricant at a relatively high temperature may be provided to the gearbox assembly 100.

The flow rate control valve 224 and the bypass valve 230 may include any suitable three port valve. For example, one or both of the flow rate control valve 224 and the bypass valve 230 may include a three-way ball valve. Additionally, or alternatively, one or both of the flow rate control valve 224 and the bypass valve 230 may include any other suitable structure capable of providing a variable throughput between the flow inlets 240 and 246 and the flow outlets 242 and 248, respectively.

Alternatively, in other exemplary embodiments, the lubrication system 200 may have any other suitable configuration for controlling a flow rate of lubricant to the gearbox assembly 100 or a temperature of lubricant provided to the gearbox assembly 100. For example, FIGS. 6 and 7 show exemplary alternative lubrication systems.

Figure 6:
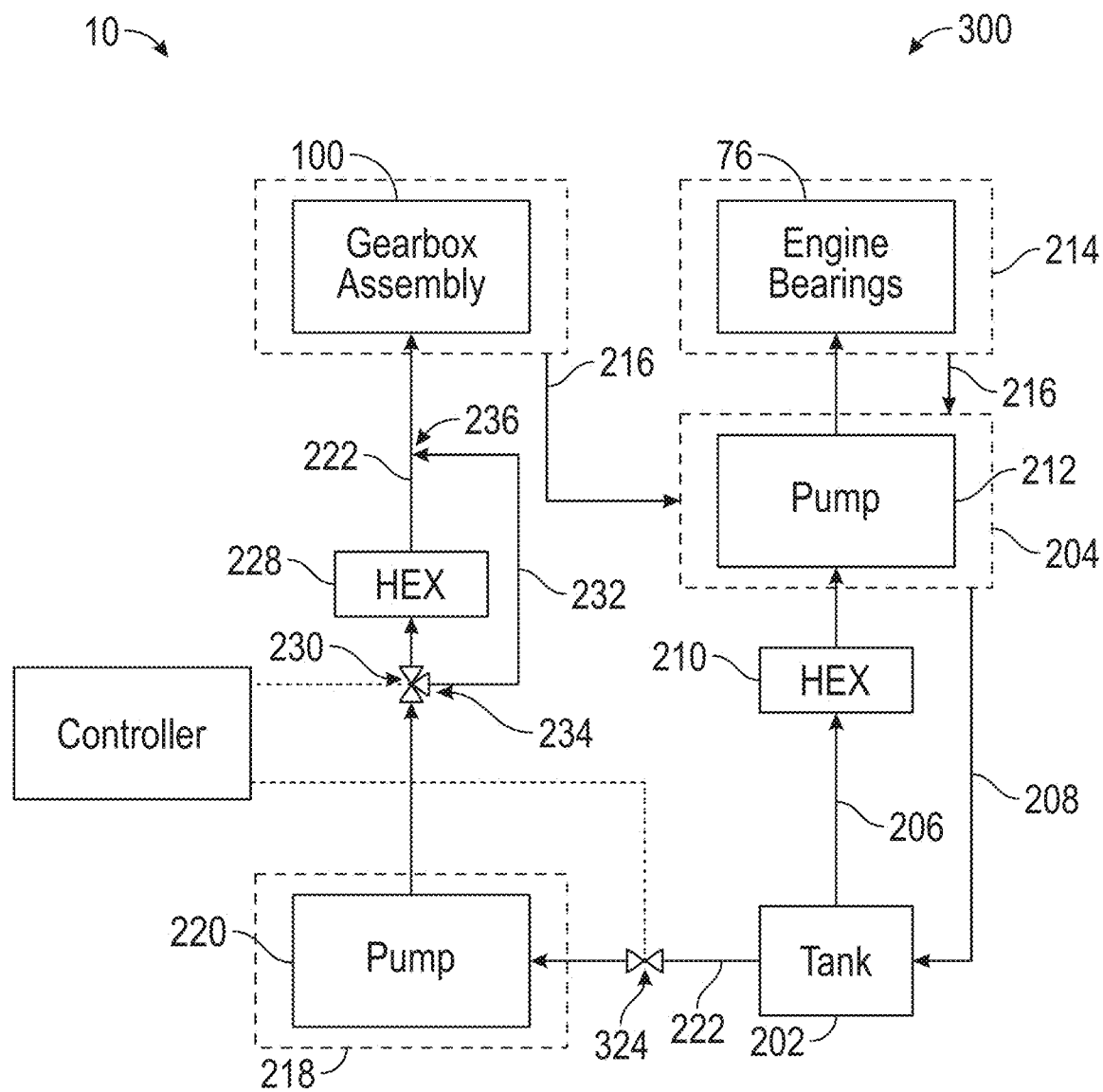
FIG. 6 is a schematic view of a lubrication system for the gas turbine engine of FIG. 1, according to an embodiment of the present disclosure.

FIG. 6 is a schematic view of a lubrication system 300 for the gas turbine engine 10, according to an embodiment of the present disclosure. The lubrication system 300 depicted in FIG. 6 may be configured in substantially the same manner as the lubrication system 200 depicted in FIG. 4 and described above. However, the lubrication system 300 includes a flow rate control valve 324 that is instead positioned in the flow of lubricant generated by the gearbox lubricant pump 220 at a location upstream from the gearbox lubrication unit 218 and the gearbox lubricant pump 220. With such a configuration, the flow rate control valve 324 may not be a three-way valve and the lubrication system 300 may not include a return line fluidly connecting to the flow rate control valve 324 and the tank 202. Instead, the flow rate control valve 324 may be any suitable valve defining a variable throughput between an inlet and an outlet.

Figure 7:
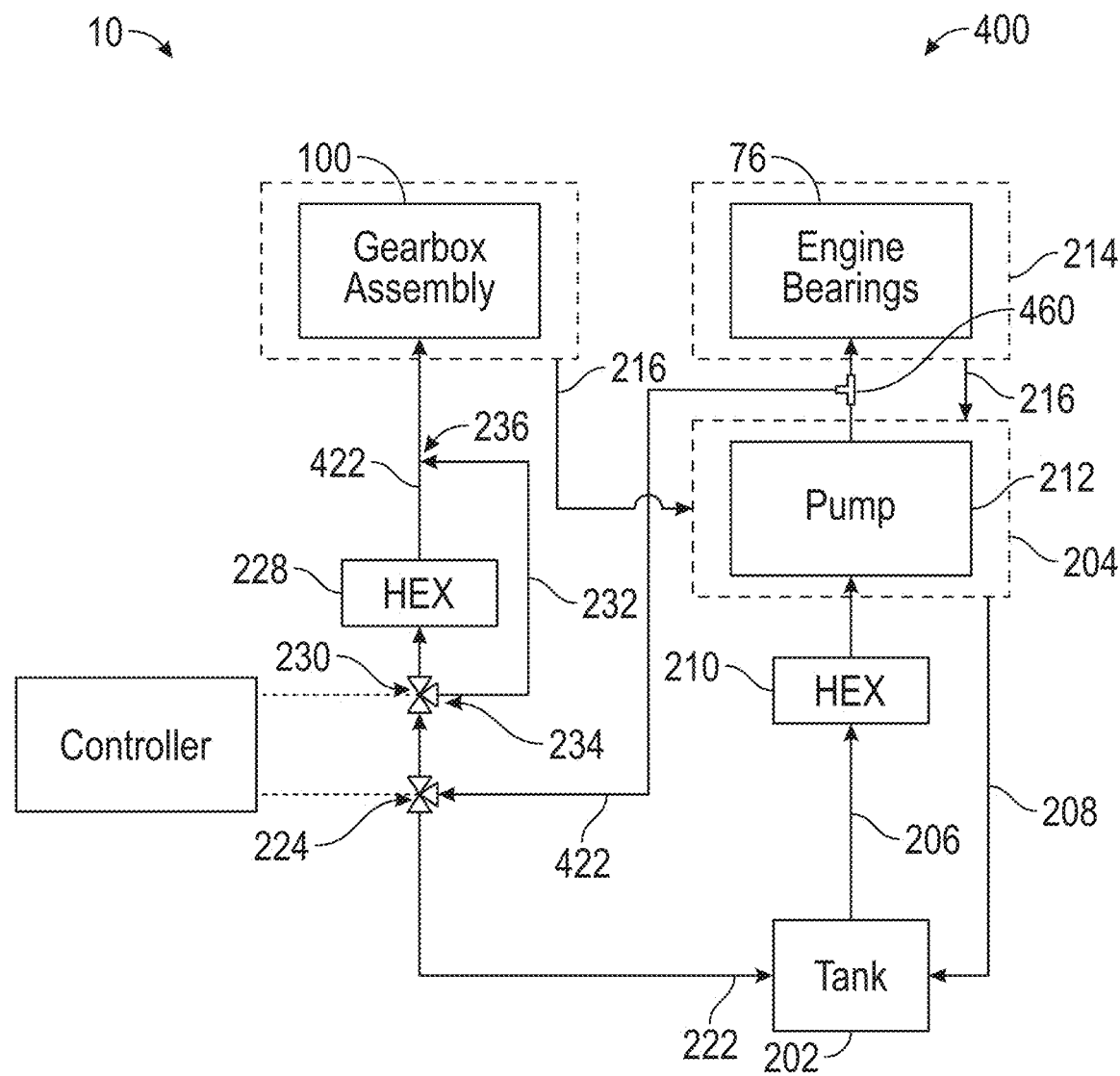
FIG. 7 is a schematic view of a lubrication system for the gas turbine engine of FIG. 1, according to an embodiment of the present disclosure.

FIG. 7 is a schematic view of a lubrication system 400 for the gas turbine engine 10, according to an embodiment of the present disclosure. The lubrication system 400 depicted in FIG. 7 may be configured in substantially the same manner as the lubrication system 200 depicted in FIG. 4 and described above. However, the lubrication system 400 does not include a gearbox lubrication unit 218 or a gearbox lubricant pump 220. Instead, the flow of lubricant generated by the engine lubricant pump 212 (of the engine lubrication unit 204) is split downstream of the engine lubricant pump 212 at a junction 460 to provide a dedicated flow of lubricant to the gearbox assembly 100. At the junction 460, the flow of lubricant in the engine lubricant supply line 206 is split between a first flow of lubricant to the engine bearings 76 and a second flow of lubricant to the gearbox assembly 100 through a gearbox lubricant supply line 422.

As is depicted, the second flow of lubricant and the gearbox lubricant supply line 222 is configured to provide lubricant directly to the gearbox assembly 100 of the gas turbine engine 10. With such an exemplary embodiment, the flow rate control valve 224 and the bypass valve 230 are positioned in and in fluid communication with the second flow of lubricant, downstream from the junction 460.

However, still other exemplary embodiments may include any other suitable configuration. For example, referring still to FIG. 7, in other exemplary embodiments, the flow rate control valve 224 may instead be positioned at the junction 460 where the flow of lubricant is split off between the first flow of lubricant and the second flow lubricant. With such an exemplary embodiment, the flow rate control valve 224 may define an inlet in flow communication with the engine lubricant supply line 206, a first outlet also in flow communication with the engine lubricant supply line 206, and a second outlet in flow communication with the gearbox lubricant supply line 222. Such a flow rate control valve 224 may define a variable throughput between the inlet and the second outlet to control an amount of lubricant provided to the gearbox assembly 100.

Referring back to FIG. 3, as the volume of the gearbox 101 increases, the diameter of the gearbox $D_{GB}$, increases. As the power output of the gearbox 101 increases the amount of heat generated increases. The increase in heat generation increases the volume of lubricant required to operate the gearbox, which calls for an increased gutter volume $V_G$ for capture and recirculation of lubricant through the scavenging system. However, it is also desired to reduce the overall footprint of the gearbox lubricant and scavenge system given an emphasis on decreasing packaging space available for the gearbox and lubricant scavenge system, especially for engines with power gearboxes operating with relatively high gear ratios, e.g., between, inclusive of the endpoints, 2.5 to 3.5, 3.0, 3.25, 4.0, and above gear ratios (GRs).

In view of the foregoing, it is desirable to improve, or at least maintain, a target efficiency of a gearbox without oversizing a gutter or scavenge system, or while reducing its size to accommodate only what is needed or can be accommodated in terms of weight increase or volume. When developing a gas turbine engine, the interplay among components can make it particularly difficult to select or to develop one component (e.g., the gutter 114) during engine design and prototype testing, especially, when some components are at different stages of completion. For example, one or more components may be nearly complete, yet one or more other components may be in an initial or preliminary phase. It is desired to arrive at what is possible at an early stage of design, so that the down selection of candidate optimal designs, given the tradeoffs, become more possible. Heretofore, the process has sometimes been more ad hoc, selecting one design or another without knowing the impact when a concept is first taken into consideration. For example, various aspects of the fan section 14 design, compressor section 22 design, combustion section 28, or turbine section 30 design, may not be known at the time of design of the gutter, but such components impact the size of the gearbox 101 required and the amount of lubricant required, and thus, the design of the gutter 114.

The inventors desire to arrive at a more favorable balance between maximizing gearbox scavenge flow collection while minimizing other, potential negative effects on an improperly chosen gutter size had previously involved, e.g., the undertaking of multivariate trade studies, which may or may not have yielded an improved, or best match gutter/scavenge for a particular architecture. Unexpectedly, it was discovered that a relationship exists between the volume of the gutter and gearbox volume that uniquely identified a finite and readily ascertainable (in view of this disclosure) number of embodiments suited for a particular architecture, which improves the weight—volume—scavenge effectiveness tradeoffs for a particular architecture. This relationship the inventors refer to as the Lubricant Extraction Volume Ratio (LEVR):

$$LEVR = \frac{V_G}{V_{GB}} \quad (1)$$

$V_G$ represents the gutter volume, as identified with respect to FIGS. 2 and 3. The gutter volume may be determined by calculating the volume within a cross section of the gutter. $V_{GB}$ represents the gearbox volume, which is defined below (2). For engine power between eighteen kHP and thirty-five kHP, inclusive of the endpoints, the gearbox volume $V_{GB}$ is between eight hundred in³ and two thousand in³, inclusive of the endpoints. In some examples, the engine is a turbofan engine. The inventors found that the gutter volume $V_G$ should be selected based on the range 0.01≤LEVR≤ to 0.3 (gutter volume is between 1 percent and 30 percent the gearbox volume, inclusive of the endpoints).

$$V_{GB} = L_{GB} * \pi * \left(\frac{D_{GB}}{2}\right)^2 \quad (2)$$

$L_{GB}$ represents the gearbox length, as identified with respect to FIG. 2. Although described with respect to gears of the same length in FIG. 2, the gearbox length may be defined by any of the sun gear 102, a planet gear 104, or the ring gear 106, instances when the aforementioned gears are of different lengths. In (2), $D_{GB}$ represents the gearbox diameter, as identified with respect to FIG. 3.

Figure 8:
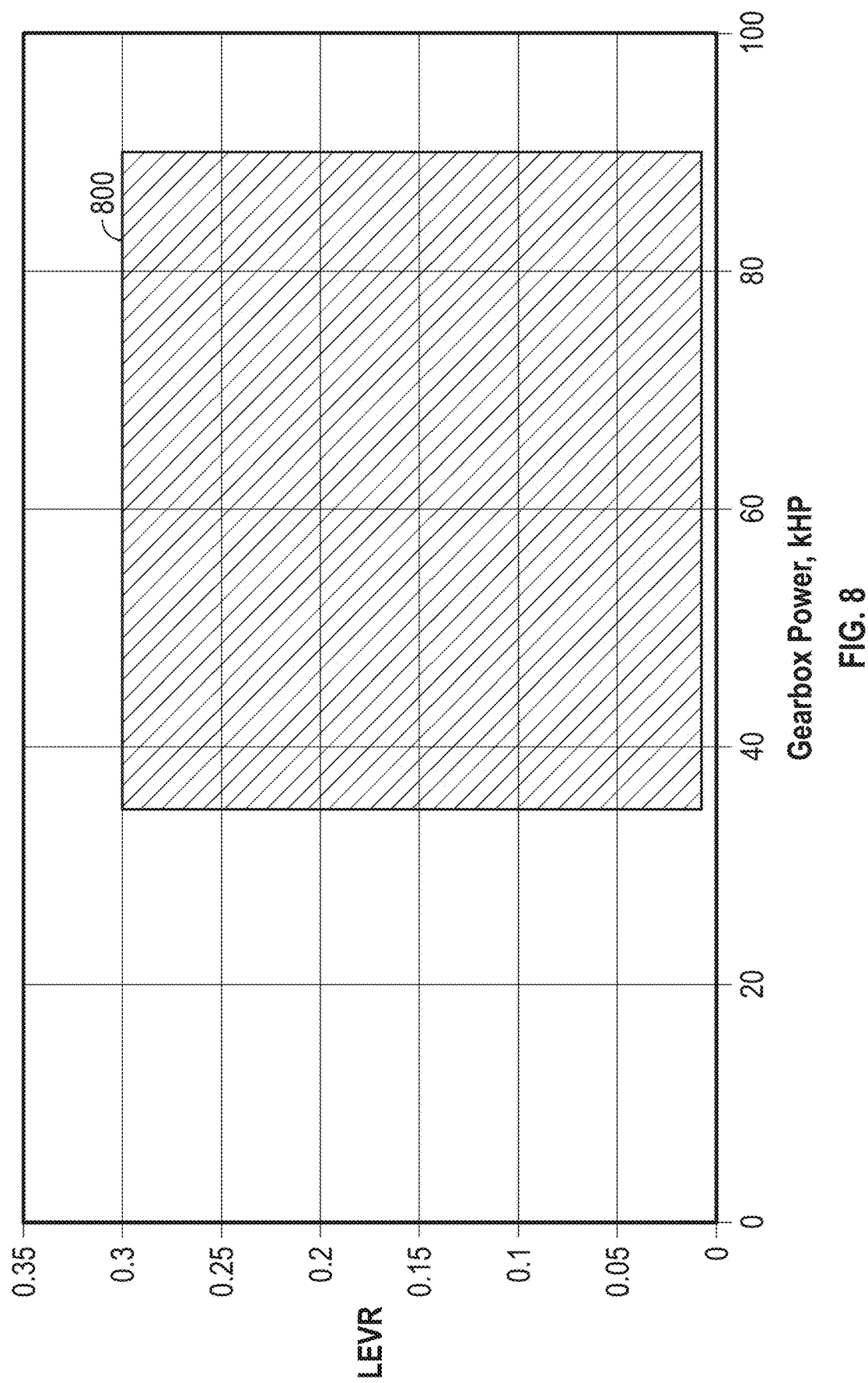
FIG. 8 illustrates a graph showing the lubricant extraction volume ratio as a function of gearbox power, according to an embodiment of the present disclosure.
Figure 9:
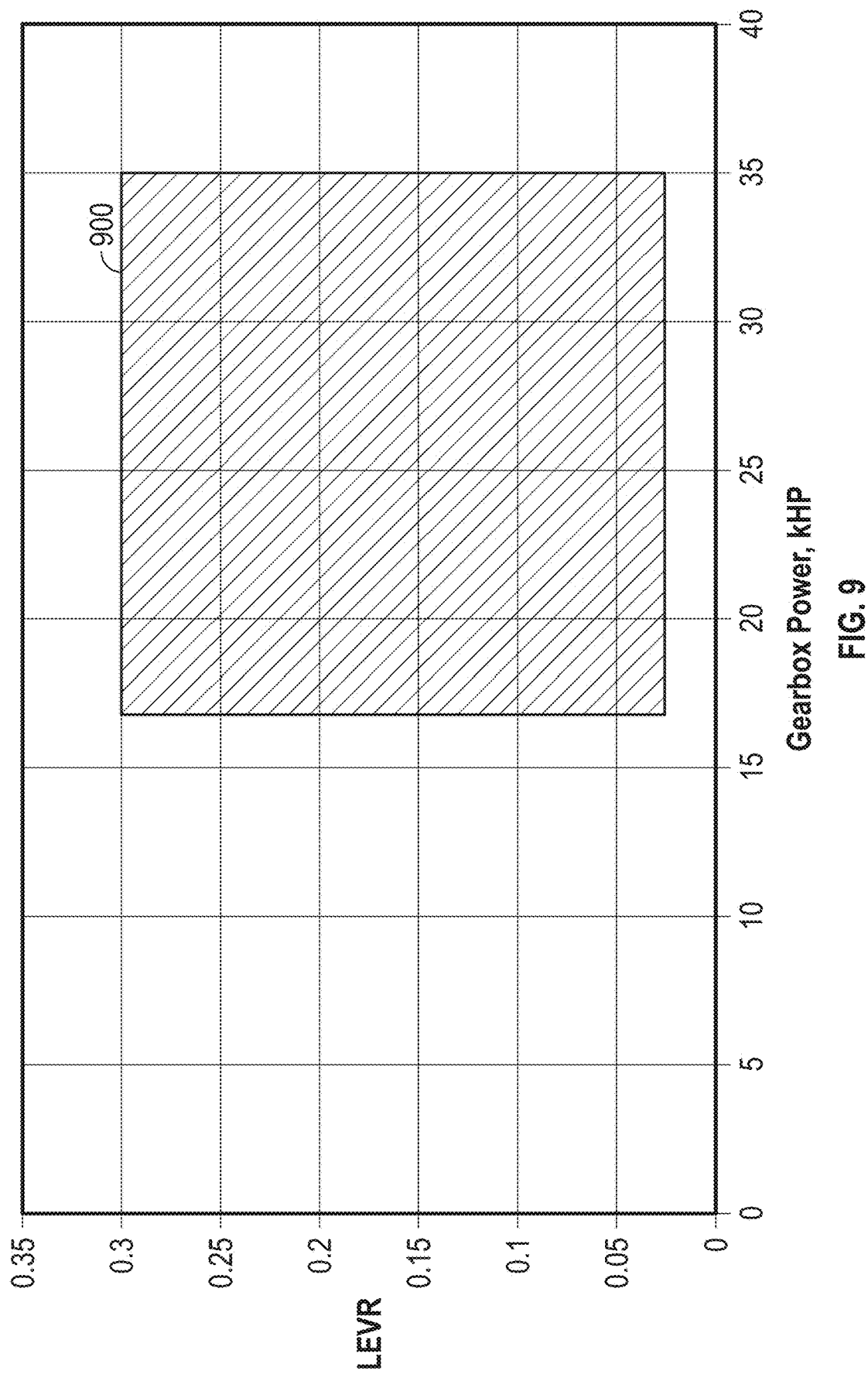
FIG. 9 illustrates a graph showing the lubricant extraction volume ratio as a function of gearbox power, according to an embodiment of the present disclosure.

In some embodiments, and as shown in a region 800 of FIG. 8, the LEVR is between 0.01 and 0.3, inclusive of the endpoints, for maximum gearbox power of between thirty-five kHP and ninety kHP, inclusive of the endpoints. In some embodiments, and as shown in a region 900 of FIG. 9, the LEVR is between 0.03 and 0.3, inclusive of the endpoints, for a maximum gearbox power of less than or equal to thirty-five kHP.

If the gutter volume relative to the gearbox volume is such that the LEVR upper limit is exceeded (e.g., a "large gutter"), there is too large of a volume within the gutter than is needed to recover gearbox lubricant scavenge, which can lead to increased lubricant churning loss and lubricant foaming in the gutter, leading to increased power loss in the overall gearbox assembly. The foaming in the gutter can generate drag in the gutter and negatively impact gearbox performance, and ultimately, engine performance. Furthermore, a large gutter requires more radial space and the increased material, mass, and size, etc., of the large gutter encroaches upon other system components within the engine (e.g., the core flow path), which, again, negatively impacts gearbox performance. The LEVR is selected to balance recovery of gearbox lubricant scavenge and impact to the engine operation and efficiency.

If the gutter volume relative to the gearbox volume is such that the LEVR lower limit is violated (e.g., a "small gutter"), there is too small of a volume within the gutter than is needed to recover the gearbox lubricant scavenge. The gutter will not fully capture the gearbox lubricant scavenge (e.g., flow $F_2$), leading to inadequate removal of the lubricant from the gearbox sump. This can lead to leakage of the scavenge lubricant back into the gearbox or to other areas of the engine, negatively impacting the performance of both the gearbox and the engine. The lower limit of the LEVR is selected to balance recovery of gearbox lubricant scavenge and impact to the gearbox and engine operation and efficiency (e.g., volume & weight penalty).

Taking into consideration the above considerations for selecting upper and lower limits, the LEVR may also be defined in terms of a Power Factor, Flow Transition Time and a Heat Density Parameter:

$$LEVR = PF * \frac{FT}{HDP} \quad (3)$$

where PF represents the Power Factor, FT represents the Flow Transition Time, and HDP represents the Heat Density parameter. The Power Factor PF is defined in (4):

$$PF = PD * (1 - \eta) \quad (4)$$

where PD represents the gearbox power density and $\eta$ represents the gearbox efficiency. The power density PD is a ratio of the power of the gearbox to the volume of the gearbox and is between fifteen thousand hp/ft$^3$ and forty-five thousand hp/ft$^3$, inclusive of the endpoints. The gearbox efficiency is between 99.2 percent and 99.8 percent, inclusive of the endpoints.

The Flow Transition Time FT is given by:

$$FT = \frac{V_G}{V_{dot}} \quad (5)$$

where $V_G$ represents the gutter volume, as identified with respect to FIGS. 2 and 3. $V_{dot}$ represents the lubricant volumetric flow rate. The lubricant volumetric flow rate is defined by the gearbox power and the efficiency. Since the inefficiency of the gearbox generates heat, a certain quantity of lubricant is required to remove the heat. The Flow Transition Time is the time it takes the lubricant to traverse the entire gutter volume. The Flow Transition Time indirectly links the gutter volume to the gearbox volume. The Flow Transition Time is between 1.5 and eleven seconds, inclusive of the endpoints.

The Heat Density parameter HDP is defined as:

$$HDP = \rho * C * \Delta T \quad (6)$$

where $\rho$ represents the fluid density, C represents the lubricant specific heat, and $\Delta T$ represents the temperature rise in the lubricant, which, is between twenty degrees Celsius and forty-five degrees Celsius, inclusive of the endpoints.

Table 1 describes exemplary embodiments 1 and 2 identifying the LEVR for various engines. The embodiments 1 and 2 are for narrow body, turbofan engines. The LEVR of the present disclosure is not limited to such engines, however, and may be applicable over a wide range of thrust class and engine designs, including, for example, wide body engines. In some examples, the engine may include, but is not limited to, business jet propulsion engines, small turbofan engines, open rotor engines, marine and industrial turbine engines, including portable power generation units, and marine propulsion for ships.

TABLE 1

| Embodiments | Power (kHP) | $V_G$ (in^3) | $V_{GB}$ (in^3) | LEVR |
|---|---|---|---|---|
| 1 | 20-30 | 253 | 5601 | .045 |
| 2 | 17 | 37 | 691 | .054 |

As the gearbox power, and, thus, the gearbox size/volume increases, the gutter volume also must increase to ensure proper function of the gutter. However, the relationship between LEVR and gearbox (fan) power is not linear. Furthermore, different gearbox configurations like planetary and differential could require more lubricant flow due to the lower efficiency compared to a star gearbox configuration. Therefore, these higher power gearboxes with different operating configurations could yield LEVR nearing 0.3. Accordingly, for star gearbox configurations, Table 1 shows this relationship.

Accordingly, the gutter volume is critical to minimizing the lubricant scavenge losses as the lubricant exits the gearbox and is redirected to the scavenge port of the gutter.

Therefore, the present disclosure defines a lubricant extraction volume ratio that improves or maintains gearbox efficiency, while ensuring the gutter provided with the gearbox is not oversized or undersized with respect to the needs of the gearbox. By maintaining the gutter within the range defined by the lubricant extraction volume ratio, scavenge flow collection is maximized and the negative effects of the gutter (e.g., added weight and size to the system) that may contribute to a reduction in gearbox efficiency are minimized.

Further aspects of the present disclosure are provided by the subject matter of the following clauses.

According to an aspect of the present disclosure, a gearbox assembly comprises a gearbox and a gutter. The gutter is for collecting a gearbox lubricant scavenge flow from the gearbox, the gutter being characterized by a lubricant extraction volume ratio between 0.01 and 0.3, inclusive of the endpoints.

The gearbox assembly of the preceding clause, wherein the lubricant extraction volume ratio is between 0.03 and 0.3, inclusive of the endpoints, for a gearbox power less than or equal to thirty-five kHP.

The gearbox assembly of any preceding clause, wherein the lubricant extraction volume ratio is defined by a ratio of a gutter volume of the gutter to a gearbox volume of the gearbox.

The gearbox assembly of any preceding clause, wherein the gutter volume is defined by an inner surface of a gutter wall of the gutter.

The gearbox assembly of any preceding clause, wherein the gearbox volume is defined by an outer diameter of the gearbox and a gearbox length of the gearbox.

The gearbox assembly of any preceding clause, wherein the outer diameter of the gearbox is an outer diameter of a ring gear.

The gearbox assembly of any preceding clause, wherein the gearbox length is defined between a forwardmost end of a gear of the gearbox and an aftmost end of the gear.

The gearbox assembly of any preceding clause, wherein the gearbox includes a sun gear, a plurality of planet gears, and a ring gear.

The gearbox assembly of any preceding clause, wherein the lubricant extraction volume ratio is defined by a ratio of a gutter volume of the gutter to a gearbox volume of the gearbox.

The gearbox assembly of any preceding clause, wherein the gearbox volume is defined by an outer diameter of the ring gear and a length of the gearbox.

The gearbox assembly of any preceding clause, wherein the lubricant extraction volume ratio is defined by a power factor, a flow transition time, and a heat density parameter.

The gearbox assembly of any preceding clause, wherein the flow transition time is defined by a gutter volume of the gutter and a lubricant volumetric flow rate of a lubricant through the gearbox.

The gearbox assembly of any preceding clause, wherein the flow transition time is between 1.5 seconds and eleven seconds, inclusive of the endpoints.

The gearbox assembly of any preceding clause, wherein the power factor is defined by a power density of the gearbox and an efficiency of the gearbox.

The gearbox assembly of any preceding clause, wherein the power density is between fifteen thousand hp/ft$^3$ and forty-five thousand hp/ft$^3$, inclusive of the endpoints, and the efficiency is between 99.2 percent and 99.8 percent, inclusive of the endpoints.

The gearbox assembly of any preceding clause, wherein the gearbox includes a sun gear, a plurality of planet gears, and a ring gear, and wherein the gutter circumscribes the ring gear.

The gearbox assembly of any preceding clause, wherein the gutter wholly circumscribes the ring gear.

The gearbox assembly of any preceding clause, wherein the gutter partially circumscribes the ring gear.

The gearbox assembly of any preceding clause, wherein the gutter is located radially outward of the gearbox.

The gearbox assembly of any preceding clause, wherein the gutter further comprises a scavenge port located near a bottom of the gutter.

The gearbox assembly of any preceding clause, wherein the gearbox is a star configuration.

The gearbox assembly of any preceding clause, wherein the gearbox is a planetary configuration.

The gearbox assembly of any preceding clause, wherein the gearbox is a differential gearbox.

The gearbox assembly of any preceding clause, wherein the gearbox volume is between eight hundred in$^3$ and two thousand in$^3$, inclusive of the endpoints, when the engine power is between eighteen kHP and thirty-five kHP, inclusive of the endpoints.

The gearbox assembly of any preceding clause, wherein the gutter volume is between 0.01 and 0.3 times, inclusive of the endpoints, the gearbox volume.

According to an aspect of the present disclosure, a gas turbine engine comprises a gearbox assembly comprising a gearbox and a gutter. The gutter is for collecting a gearbox lubricant scavenge flow from the gearbox, the gutter being characterized by a lubricant extraction volume ratio between 0.01 and 0.3, inclusive of the endpoints.

The gas turbine engine of any preceding clause, wherein the lubricant extraction volume ratio is between 0.01 and 0.3, inclusive of the endpoints, when the gas turbine engine has an engine power greater than or equal to thirty-five kHP.

The gas turbine engine of any preceding clause, wherein the engine power is between thirty-five kHP and ninety kHP, inclusive of the endpoints.

The gas turbine engine of any preceding clause, wherein the lubricant extraction volume ratio is between 0.03 and 0.3, inclusive of the endpoints.

The gas turbine engine of any preceding clause, wherein the lubricant extraction volume ratio is between 0.03 and 0.3, inclusive of the endpoints, when the gas turbine engine has an engine power less than or equal to thirty-five kHP.

The gas turbine engine of any preceding clause, wherein the lubricant extraction volume ratio is defined by a ratio of a gutter volume of the gutter to a gearbox volume of the gearbox.

The gas turbine engine of any preceding clause, wherein the gutter volume is defined by an inner surface of a gutter wall of the gutter.

The gas turbine engine of any preceding clause, wherein the gearbox volume is defined by an outer diameter of the gearbox and a gearbox length of the gearbox.

The gas turbine engine of any preceding clause, wherein the outer diameter of the gearbox is an outer diameter of a ring gear.

The gas turbine engine of any preceding clause, wherein the gearbox length is defined between a forwardmost end of a gear of the gearbox and an aftmost end of the gear.

The gas turbine engine of any preceding clause, wherein the gearbox includes a sun gear, a plurality of planet gears, and a ring gear.

The gas turbine engine of any preceding clause, wherein the lubricant extraction volume ratio is defined by a ratio of a gutter volume of the gutter to a gearbox volume of the gearbox.

The gas turbine engine of any preceding clause, wherein the gearbox volume is defined by an outer diameter of the ring gear and a length of the gearbox.

The gas turbine engine of any preceding clause, wherein the lubricant extraction volume ratio is defined by a power factor, a flow transition time, and a heat density parameter.

The gas turbine engine of any preceding clause, wherein the power factor is defined by a power density of the gearbox and an efficiency of the gearbox.

The gas turbine engine of any preceding clause, wherein the power density is between fifteen thousand hp/ft$^3$ and forty-five thousand hp/ft$^3$, inclusive of the endpoints, and the efficiency is between 99.2 percent and 99.8 percent, inclusive of the endpoints.

The gas turbine engine of any preceding clause, wherein the flow transition time is defined by a gutter volume of the gutter and a lubricant volumetric flow rate of a lubricant through the gearbox.

The gas turbine engine of any preceding clause, wherein the flow transition time is between 1.5 seconds and eleven seconds, inclusive of the endpoints.

The gas turbine engine of any preceding clause, wherein the gearbox includes a sun gear, a plurality of planet gears, and a ring gear, and wherein the gutter circumscribes the ring gear.

The gas turbine engine of any preceding clause, wherein the gutter wholly circumscribes the ring gear.

The gas turbine engine of any preceding clause, wherein the gutter partially circumscribes the ring gear.

The gas turbine engine of any preceding clause, wherein the gutter is located radially outward of the gearbox.

The gas turbine engine of any preceding clause, wherein the gutter further comprises a scavenge port located near a bottom of the gutter.

The gas turbine engine of any preceding clause, wherein the gearbox is a star configuration.

The gas turbine engine of any preceding clause, wherein the gearbox is a planetary configuration.

The gas turbine engine of any preceding clause, wherein the gearbox is a differential gearbox.

The gas turbine engine of any preceding clause, wherein the gearbox volume is between eight hundred in$^3$ and two thousand in³, inclusive of the endpoints, when the engine power is between eighteen kHP and thirty-five kHP, inclusive of the endpoints.

The gas turbine engine of any preceding clause, wherein the gutter volume is between 0.01 and 0.3 times, inclusive of the endpoints, the gearbox volume.

A gas turbine engine including a gearbox assembly including a gearbox having a gearbox volume defined by an outer diameter of the gearbox and a gearbox length of the gearbox, and a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, the lubricant extraction volume ratio defined by $$\frac{V_G}{V_{GB}},$$

wherein $V_G$ is the gutter volume of the gutter and $V_{GB}$ is the gearbox volume, and a lubrication system including a tank that stores a lubricant therein, one or more lubricant pumps for generating a flow of lubricant from the tank to the gearbox assembly, and a flow rate control valve in fluid communication with the flow of lubricant and defining a flow inlet and a flow outlet, the flow rate control valve defining a variable throughput from the flow inlet to the flow outlet for controlling a flowrate of the lubricant to the gearbox assembly.

The gas turbine engine of the preceding clause, wherein the flow rate control valve is positioned downstream from the one or more lubricant pumps in the flow of lubricant generated by the one or more lubricant pumps.

The gas turbine engine of any preceding clause, wherein the one or more lubricant pumps are driven by a shaft of the gas turbine engine.

The gas turbine engine of any preceding clause, wherein the flow rate control valve is in operable communication with a controller of the gas turbine engine.

The gas turbine engine of any preceding clause, wherein the lubrication system further comprises a gearbox lubricant heat exchanger positioned in thermal communication with the flow of lubricant generated by the one or more lubricant pumps at a location downstream of the flow rate control valve for controlling a temperature of the lubricant to the gearbox assembly.

The gas turbine engine of any preceding clause, wherein the lubrication system further comprises a bypass valve in fluid communication with the flow of lubricant generated by the one or more lubricant pumps and defining a flow inlet, a flow outlet, and a bypass outlet, wherein the bypass outlet is in fluid communication with a bypass line, and wherein the bypass line extends between the bypass outlet and the flow of lubricant generated by the one or more lubricant pumps at a location downstream from the gearbox lubricant heat exchanger.

The gas turbine engine of any preceding clause, wherein the one or more lubricant pumps include a gearbox lubricant pump for generating the flow of lubricant to the gearbox assembly, and the lubrication system further comprises an engine lubricant pump for generating a flow of lubricant to one or more engine bearings of the gas turbine engine.

The gas turbine engine of any preceding clause, wherein the lubrication system includes an engine lubricant heat exchanger positioned in thermal communication with the flow of lubricant generated by the engine lubricant pump at a location upstream of the engine lubricant pump.

The gas turbine engine of any preceding clause, wherein the flow of lubricant generated by the one or more lubricant pumps is split downstream of the one or more lubricant pumps between a first flow path and a second flow path, wherein the second flow path is configured to provide the flow of lubricant to the gearbox assembly, and the flow rate control valve is in fluid communication with the second flow path.

The gas turbine engine of any preceding clause, wherein the one or more lubricant pumps are further configured to generate a flow of lubricant from the tank through the first flow path to one or more of a compressor section of the gas turbine engine and a turbine section of the gas turbine engine.

A gas turbine engine including a fan section, a compressor section, a turbine section having a shaft that drives the compressor section, and a combustion section in flow communication with the compressor section and the turbine section, a gearbox assembly configured to transfer rotational energy from the shaft of the turbine section to the fan section, the gearbox assembly including a gearbox having a gearbox volume defined by an outer diameter of the gearbox and a gearbox length of the gearbox, and a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, the lubricant extraction volume ratio defined by $$\frac{V_G}{V_{GB}},$$

wherein $V_G$ is the gutter volume of the gutter and $V_{GB}$ is the gearbox volume, and a lubrication system including a tank that stores a lubricant therein, an engine lubricant pump for generating a first flow of lubricant from the tank to at least one of the compressor section or the turbine section, a gearbox lubricant pump for generating a second flow of lubricant from the tank to the gearbox assembly, and a flow rate control valve in fluid communication with the second flow of lubricant from the gearbox lubricant pump and defining a flow inlet and a flow outlet, the flow rate control valve defining a variable throughput from the flow inlet to the flow outlet for controlling a flowrate of the second flow of lubricant to the gearbox assembly.

The gas turbine engine of the preceding clause, wherein the flow rate control valve is positioned downstream from the gearbox lubricant pump in the second flow of lubricant generated by the gearbox lubricant pump.

The gas turbine engine of any preceding clause, wherein the flow rate control valve further defines a return outlet in fluid communication with a return line, and wherein the return line extends from the return outlet of the flow rate control valve to the tank for returning a portion of the second flow of lubricant to the tank.

The gas turbine engine of any preceding clause, wherein the gearbox lubricant pump is driven by the shaft of the turbine section.

The gas turbine engine of any preceding clause, wherein the engine lubricant pump is driven by the shaft of the turbine section.

The gas turbine engine of any preceding clause, wherein the flow rate control valve is in operable communication with a controller of the gas turbine engine.

The gas turbine engine of any preceding clause, wherein the lubrication system includes an engine lubricant heat exchanger positioned in thermal communication with the first flow of lubricant generated by the engine lubricant pump.

The gas turbine engine of any preceding clause, wherein the lubrication system further comprises a gearbox lubricant heat exchanger positioned in thermal communication with the second flow of lubricant for removing heat from the second flow of lubricant.

The gas turbine engine of any preceding clause, wherein the gearbox lubricant heat exchanger is positioned at a location downstream of the flow rate control valve for controlling a temperature of the lubricant to the gearbox assembly.

The gas turbine engine of any preceding clause, wherein the lubrication system further comprises a bypass valve in fluid communication with the second flow of lubricant and defining a flow inlet, a flow outlet, and a bypass outlet, wherein the bypass outlet is in fluid communication with a bypass line, and wherein the bypass line extends between the bypass outlet and the second flow of lubricant generated at a location downstream from the gearbox lubricant heat exchanger.

Although the foregoing description is directed to the preferred embodiments, other variations and modifications will be apparent to those skilled in the art, and may be made without departing from the disclosure. Moreover, features described in connection with one embodiment may be used in conjunction with other embodiments, even if not explicitly stated above.

The invention claimed is:

1. A gas turbine engine comprising:
 a gearbox assembly comprising:
  a gearbox having a gearbox volume defined by an outer diameter of the gearbox and a gearbox length of the gearbox; and
  a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, the lubricant extraction volume ratio defined by:

$$\frac{V_G}{V_{GB}},$$

wherein $V_G$ is the gutter volume of the gutter and $V_{GB}$ is the gearbox volume; and
 a lubrication system comprising:
  a tank that stores a lubricant therein;
  one or more lubricant pumps for generating a flow of lubricant from the tank to the gearbox assembly;
  a flow rate control valve in fluid communication with the flow of lubricant and defining a flow inlet and a flow outlet, the flow rate control valve defining a variable throughput from the flow inlet to the flow outlet for controlling a flowrate of the lubricant to the gearbox assembly; and
  a gearbox lubricant heat exchanger positioned in thermal communication with the flow of lubricant generated by the one or more lubricant pumps at a location downstream of the flow rate control valve for controlling a temperature of the lubricant to the gearbox assembly.

2. The gas turbine engine of claim 1, wherein the flow rate control valve is positioned downstream from the one or more lubricant pumps in the flow of lubricant generated by the one or more lubricant pumps.

3. The gas turbine engine of claim 1, wherein the one or more lubricant pumps are driven by a shaft of the gas turbine engine.

4. The gas turbine engine of claim 1, wherein the flow rate control valve is in operable communication with a controller of the gas turbine engine.

5. The gas turbine engine of claim 1, wherein the lubrication system further comprises a bypass valve in fluid communication with the flow of lubricant generated by the one or more lubricant pumps and defining a flow inlet, a flow outlet, and a bypass outlet, wherein the bypass outlet is in fluid communication with a bypass line, and wherein the bypass line extends between the bypass outlet and the flow of lubricant generated by the one or more lubricant pumps at a location downstream from the gearbox lubricant heat exchanger.

6. The gas turbine engine of claim 1, wherein the one or more lubricant pumps include a gearbox lubricant pump for generating the flow of lubricant to the gearbox assembly, and the lubrication system further comprises an engine lubricant pump for generating a flow of lubricant to one or more engine bearings of the gas turbine engine.

7. The gas turbine engine of claim 6, wherein the lubrication system includes an engine lubricant heat exchanger positioned in thermal communication with the flow of lubricant generated by the engine lubricant pump at a location upstream of the engine lubricant pump.

8. The gas turbine engine of claim 1, wherein the flow of lubricant generated by the one or more lubricant pumps is split downstream of the one or more lubricant pumps between a first flow path and a second flow path, wherein the second flow path is configured to provide the flow of lubricant to the gearbox assembly, and the flow rate control valve is in fluid communication with the second flow path.

9. The gas turbine engine of claim 8, wherein the one or more lubricant pumps are further configured to generate a flow of lubricant from the tank through the first flow path to one or more of a compressor section of the gas turbine engine and a turbine section of the gas turbine engine.

10. The gas turbine engine of claim 1, wherein the lubricant extraction volume ratio is between 0.01 and 0.3, inclusive of the endpoints, for a maximum gearbox power greater than 35 kHp and less than or equal to 90 kHP, and the lubricant extraction volume ratio is between 0.03 to 0.3, inclusive of the endpoints, for a maximum gearbox power less than or equal to 35 kHP.

11. A gas turbine engine comprising:
 a fan section, a compressor section, a turbine section having a shaft that drives the compressor section, and a combustion section in flow communication with the compressor section and the turbine section;
 a gearbox assembly configured to transfer rotational energy from the shaft of the turbine section to the fan section, the gearbox assembly comprising:
  a gearbox having a gearbox volume defined by an outer diameter of the gearbox and a gearbox length of the gearbox; and
  a gutter for collecting a gearbox lubricant scavenge flow from the gearbox, the gutter having a gutter volume defined by an inner surface of a gutter wall of the gutter and being characterized by a lubricant extraction volume ratio between 0.01 and 0.3, inclusive of the endpoints, the lubricant extraction volume ratio defined by:

$$\frac{V_G}{V_{GB}},$$

wherein $V_G$ is the gutter volume of the gutter and $V_{GB}$ is the gearbox volume; and a lubrication system comprising:
  a tank that stores a lubricant therein;
  an engine lubricant pump for generating a first flow of lubricant from the tank to at least one of the compressor section or the turbine section;
  a gearbox lubricant pump for generating a second flow of lubricant from the tank to the gearbox assembly; and
  a flow rate control valve in fluid communication with the second flow of lubricant from the gearbox lubricant pump and defining a flow inlet and a flow outlet, the flow rate control valve defining a variable throughput from the flow inlet to the flow outlet for controlling a flowrate of the second flow of lubricant to the gearbox assembly.

12. The gas turbine engine of claim 11, wherein the flow rate control valve is positioned downstream from the gearbox lubricant pump in the second flow of lubricant generated by the gearbox lubricant pump.

13. The gas turbine engine of claim 11, wherein the flow rate control valve further defines a return outlet in fluid communication with a return line, and wherein the return line extends from the return outlet of the flow rate control valve to the tank for returning a portion of the second flow of lubricant to the tank.

14. The gas turbine engine of claim 11, wherein the gearbox lubricant pump is driven by the shaft of the turbine section.

15. The gas turbine engine of claim 11, wherein the engine lubricant pump is driven by the shaft of the turbine section.

16. The gas turbine engine of claim 11, wherein the flow rate control valve is in operable communication with a controller of the gas turbine engine.

17. The gas turbine engine of claim 11, wherein the lubrication system includes an engine lubricant heat exchanger positioned in thermal communication with the first flow of lubricant generated by the engine lubricant pump.

18. The gas turbine engine of claim 11, wherein the lubrication system further comprises a gearbox lubricant heat exchanger positioned in thermal communication with the second flow of lubricant for removing heat from the second flow of lubricant.

19. The gas turbine engine of claim 18, wherein the gearbox lubricant heat exchanger is positioned at a location downstream of the flow rate control valve for controlling a temperature of the lubricant to the gearbox assembly.

20. The gas turbine engine of claim 18, wherein the lubrication system further comprises a bypass valve in fluid communication with the second flow of lubricant and defining a flow inlet, a flow outlet, and a bypass outlet, wherein the bypass outlet is in fluid communication with a bypass line, and wherein the bypass line extends between the bypass outlet and the second flow of lubricant generated at a location downstream from the gearbox lubricant heat exchanger.

* * * * *